United States Patent
Babaei et al.

(10) Patent No.: US 11,147,064 B2
(45) Date of Patent: Oct. 12, 2021

(54) RESOURCE SELECTION FOR DATA MULTIPLEXING

(71) Applicants: Alireza Babaei, Fairfax, VA (US);
Esmael Dinan, Herndon, VA (US);
Hyoungsuk Jeon, Centreville, VA (US);
Hua Zhou, Herndon, VA (US);
Kyungmin Park, Herndon, VA (US)

(72) Inventors: Alireza Babaei, Fairfax, VA (US);
Esmael Dinan, Herndon, VA (US);
Hyoungsuk Jeon, Centreville, VA (US);
Hua Zhou, Herndon, VA (US);
Kyungmin Park, Herndon, VA (US)

(73) Assignee: Ofinno, LLC, Reston, VA (US)

( * ) Notice: Subject to any disclaimer, the term of this patent is extended or adjusted under 35 U.S.C. 154(b) by 182 days.

(21) Appl. No.: 16/122,428

(22) Filed: Sep. 5, 2018

(65) Prior Publication Data

US 2019/0075563 A1    Mar. 7, 2019

Related U.S. Application Data

(60) Provisional application No. 62/555,374, filed on Sep. 7, 2017.

(51) Int. Cl.
*H04W 72/04* (2009.01)
*H04W 72/10* (2009.01)
(Continued)

(52) U.S. Cl.
CPC ......... *H04W 72/0446* (2013.01); *H04L 5/003* (2013.01); *H04L 5/0053* (2013.01);
(Continued)

(58) Field of Classification Search
CPC ......... H04W 72/0413; H04W 72/0446; H04W 72/10; H04W 52/365; H04W 72/02;
(Continued)

(56) References Cited

U.S. PATENT DOCUMENTS 9,591,661 B2*   3/2017  Kodali .............. H04W 72/1278
2017/0265183 A1*  9/2017  Chen .................. H04W 52/365

OTHER PUBLICATIONS

R2-1709263 Discussion on SPS and grant-free on SCell; 3GPP TSG-RAN WG2 #99 MeetingR2-1709263 Berlin, Germany, Aug. 21-25, 2017; ; Agenda Item:10.3.1.8.
(Continued)

*Primary Examiner* — Hanh N Nguyen
(74) *Attorney, Agent, or Firm* — David Grossman; Kavon Nasabzedeh; Philip Smith

(57) ABSTRACT

A wireless device may receive one or more messages. The one or more messages may comprise first configuration parameters of a periodic resource allocation, and second configuration parameters of one or more logical channels. Downlink control information may be received. The downlink control information may indicate a first radio resource. The first radio resource or the second radio resource may be selected as a selected resource based on a time difference between the first radio resource and a second radio resource of the periodic resource allocation. Data of the one or more logical channels in a transport block may be transmitted via the selected resource.

15 Claims, 22 Drawing Sheets

(51) Int. Cl.
*H04L 5/00* (2006.01)
*H04W 72/02* (2009.01)
(52) U.S. Cl.
CPC ........... *H04L 5/0094* (2013.01); *H04W 72/02* (2013.01); *H04W 72/10* (2013.01); *H04W 72/042* (2013.01)
(58) Field of Classification Search
CPC .... H04W 72/042; H04L 5/0053; H04L 5/003; H04L 5/0094
See application file for complete search history.

(56) References Cited

OTHER PUBLICATIONS

R2-1709264 Discussion on type 1 grant-free for connected mode UE; 3GPP TSG-RAN WG2 Meeting #99; Berlin, Germany, Aug. 21-25, 2017; Agenda Item:10.3.1.8.
3GPP TS 36.211 V14.3.0 (Jun. 2017); Technical Specification; 3rd Generation Partnership Project; Technical Specification Group Radio Access Network; Evolved Universal Terrestrial Radio Access (E-UTRA);; Physical channels and modulation.
3GPP TS 36.212 V14.3.0 (Jun. 2017); Technical Specification; 3rd Generation Partnership Project; Technical Specification Group Radio Access Network; Evolved Universal Terrestrial Radio Access (E-UTRA); Multiplexing and channel coding; (Release 14).
3GPP TS 36.213 V14.3.0 (Jun. 2017); Technical Specification; 3rd Generation Partnership Project; Technical Specification Group Radio Access Network; Evolved Universal Terrestrial Radio Access (E-UTRA); Physical layer procedures; (Release 14).
3GPP TS 36.300 V14.3.0 (Jun. 2017); Technical Specification; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;; Stage 2.
3GPP TS 36.321 V14.3.0 (Jun. 2017); Technical Specification; 3rd Generation Partnership Project; Technical Specification Group Radio Access Network; Evolved Universal Terrestrial Radio Access (E-UTRA); Medium Access Control (MAC) protocol specification; (Release 14).
3GPP TS 36.331 V14.3.0 (Jun. 2017); Technical Specification; 3rd Generation Partnership Project; Technical Specification Group Radio Access Network; Evolved Universal Terrestrial Radio Access (E-UTRA); Radio Resource Control (RRC);; Protocol specification.
3GPP TS 38.211 V0.2.0 (Aug. 2017); Technical Specification; 3rd Generation Partnership Project; Technical Specification Group Radio Access Network; NR; Physical channels and modulation; (Release 15).
3GPP TS 38.212 V0.1.0 (Aug. 2017); Technical Specification; 3rd Generation Partnership Project; Technical Specification Group Radio Access Network; NR; Multiplexing and channel coding; (Release 15).
3GPP TS 38.214 V0.1.0 (Aug. 2017); Technical Specification; 3rd Generation Partnership Project; Technical Specification Group Radio Access Network; NR;Physical layer procedures for data (Release 15).
3GPP TS 38.321 V1.0.0 (Sep. 2017); Technical Specification; 3rd Generation Partnership Project; Technical Specification Group Radio Access Network; NR; Medium Access Control (MAC) protocol specification; (Release 15).
R1-1712219; 3GPP TSG RAN WG1 Meeting #90R1-1712219 Prague, Czech Republic, Aug. 21-25, 2017; ; Agenda Item:6.1.3.3.8; Source:Huawei, HiSilicon; Title:Discussion on Multi-TRP cooperation for URLLC.
R1-1712424; 3GPP TSG RAN WG1 Meeting #90 R1-1712424 Prague, Czechia, Aug. 21-25, 2017; ; Agenda item:6.1.3.3.8; Source: CATT; Title: HARQ and scheduling aspects of ultra-reliable communications.
R1-1712461 Ultra-reliable part of URLLC for scheduling and HARQ procedure; 3GPP TSG RAN WG1 Meeting #90 R1-1712461 Prague, Czechia, Aug. 21-25, 2017; ; Source:ZTE; Title:Ultra-reliable part of URLLC for scheduling and HARQ procedure; Agenda Item:6.1.3.3.8.
R1-1712689_final_Lenovo; 3GPP TSG RAN WG1 Meeting #90 R1-1712689 Prague, P.R. Czech Aug. 21-25, 2017; ; Agenda Item:6.1.3.3.3; Source:Lenovo, Motorola Mobility; Title:HARQ design for uplink grant-free transmission.
R1-1712869_Discussion on scheduling and HARQ for URLLC reliability; 3GPP TSG RAN WG1 Meeting #90 R1-1712869 Prague, Czech Republic, Aug. 21-25, 2017; ; Source:vivo; Title:Discussion on scheduling and HARQ for URLLC reliability; Agenda Item:6.1.3.3.8.
R1-1712978—feedback for URLLC reliability; 3GPP TSG RAN WG1 Meeting#90R1-1712978 Prague, Czech Republic Aug. 21-25, 2017; Agenda Item:6.1.3.3.8; Source: Sony; Title:Feedback for improving URLLC reliability; Document for:Discussion / decision.
R1-1713200 URLLC scheduling HARQ; 3GPP TSG RAN WG1 Meeting #90 R1-1713200 Prague, Czech Republic, Aug. 21-25, 2017; Agenda Item:6.1.3.3.8; Source: LG Electronics; Title: Discussion on scheduling and HARQ procedure for URLLC; Document for:Discussion and decision.
R1-1713454 UL URLLC Capacity Based on URLLC and eMBB dynamic multiplexing; 3GPP TSG-RAN WG1 #90R1-1713454 Aug. 21-25, 2017; Prague, Czech; ; Agenda item:6.1.3.3.8; Source: Qualcomm Incorporated.
R1-1713651—Scheduling&HARQ Procedures for URLLC; 3GPP TSG RAN WG1 Meeting #90R1-1713651 Prague, Czechia Aug. 21-25, 2017; ; Agenda Item:6.1.3.3.8; Source:Samsung; Title:Scheduling/HARQ Procedures for URLLC.
R1-1713719-HARQ_procedure_for_DL_URLLC; 3GPP TSG RAN WG1 Meeting #90 R1-1713719 Prague, P.R. Czechia Aug. 21-25, 2017 ; Agenda Item: 6.1.3.3.8; Source: MediaTek Inc.; Title: HARQ Procedure for DL URLLC; Document for: Discussion and Decision.
R1-1713747; 3GPP TSG RAN WG1 Meeting #90R1-1713747 Prague, Czech Republic, Aug. 21-25, 2017; ; Agenda Item:6.1.3.3.8; Source:Huawei, HiSilicon; Title:Discussion on URLLC numerology.
R1-1713751; 3GPP TSG RAN WG1 Meeting #90; Prague, Czech Republic, Aug. 21-25, 2017 ; ; Agenda Item:6.1.3.3.8; Source:Huawei, HiSilicon; Title:On supporting ultra-reliability in a resource efficient way.
R1-1713962; 3GPP TSG RAN WG1 Meeting #90 ; Prague, Czechia, Aug. 21-25, 2017; ; Source:NTT Docomo, Inc.; Title:Scheduling and HARQ procedures for URLLC; Agenda Item:6.1.3.3.8.
R1-1714022_URLLC_grant; 3GPP TSG-RAN WG1 #90R1-1714022 Prague, Czech Republic, Aug. 21-25, 2017; ; Agenda item:6.1.3.3.8; Source:Nokia, Nokia Shanghai Bell; Title: Discussion on scheduling based URLLC transmission.
R1-1714023_URLLC_grant_reliability; 3GPP TSG-RAN WG1 #90R1-1714023 Prague, Czech Republic, Aug. 21-25, 2017; ; Agenda item:6.1.3.3.8; Source:Nokia, Nokia Shanghai Bell; Title: On reliability enhancement for scheduling information transmission.
R1-1714349 Discussion on URLLC transmitted in same or different numerology resources; 3GPP TSG-RAN WG1 Meeting #90R1-1714349 Prague, Czech Aug. 21-25, 2017; Agenda Item:6.1.3.3.8; Source: ASUSTeK; Title:Discussion on URLLC transmitted in same or different numerology resources; Document for:Discussion.
R1-1714364 On reliability of URLLC transmission in uplink ; 3GPP TSG-RAN WG1 Meeting #90R1-1714364 Prague, P.R. Czechia Aug. 21-25, 2017; Agenda item:6.1.3.3.8 Ultra-reliable part of URLLC for scheduling/HARQ procedure; Source:Institute for Information Industry (III); Title:On reliability of URLLC transmission in uplink ; Document for:Discussion and Decision.
R1-1714446; 3GPP TSG RAN WG1 Meeting#90 ; Prague, Czech Republic, Aug. 21-25, 2017; ; Agenda Item:6.1.3.3.8; Source:Ericsson; Title:On Supporting High Reliability for Data Transmission.
R2-1707742—Support SPS on SCell; 3GPP TSG RAN WG2 Meeting #99R2-1707742 Berlin, Germany, Aug. 21-25, 2017; ; Agenda Item:10.3.1.8; Source:OPPO; Title:Support SPS on SCell.
R2-1707748 38300-060; 3GPP TS 38.300 V0.6.0 (Aug. 2017) Technical Specification; 3rd Generation Partnership Project;; Tech-

(56) References Cited

OTHER PUBLICATIONS nical Specification Group Radio Access Network;; NR; NR and NG-RAN Overall Description;; Stage 2.
R2-1707930; 3GPP TSG-RAN WG2 Meeting #99; Berlin, Germany, Aug. 21-25, 2017; ; Source:CATT ; Title:Grant-free transmission; Agenda Item:10.3.1.8.
R2-1707931; 3GPP TSG-RAN WG2 Meeting #99; Berlin, Germany, Aug. 21-25, 2017; ; Source:CATT ; Title:Further consideration on multiple SPS ; Agenda Item:10.3.1.8.
R2-1708010 Considerations of SPS support on SCell and number of SPS configurations per cell group; 3GPP TSG-RAN WG2 #99R2-1708010 Berlin, Germany, Aug. 21-25, 2017; ; Agenda item:10.3.1.8; Source: Samsung Electronics R&D Institute UK; Title: Considerations of SPS support on SCell and number of SPS configurations per cell group.
R2-1708141 Further consideration on the SPS and Grant free; 3GPP TSG-RAN WG2 Meeting#99 R2-1708141 Berlin, Germany, Aug. 21-25, 2017 Revision of R2-1706645; ; Source: ZTE; Title: Further consideration on the SPS and grant-free; Agenda item:10.3.1.8.
R2-1708350—Grant Free and Semi-Persistent Scheduling in NR; 3GPP TSG-RAN WG2 #99Tdoc R2-1708350 Berlin, Germany, Aug. 21-25, 2017; ; Agenda Item:10.3.1.8; Source:Ericsson; Title:Grant Free and Semi-Persistent Scheduling in NR.
R2-1708352 General HARQ aspects of SPS UL; 3GPP TSG-RAN WG2 #99Tdoc R2-1708352 Berlin, Germany, Aug. 21-25, 2017update of R2-1707175; ; Agenda Item:10.3.1.8; Source:Ericsson; Title: General HARQ aspects of SPS UL.
R2-1708353 Enhanced HARQ feedback mode in SPS; 3GPP TSG-RAN WG2 #99Tdoc R2-1708353 Berlin, Germany, Aug. 21-25, 2017Update of R2-1707176; ; Agenda Item: 10.3.1.8; Source Ericsson; Title: Enhanced HARQ feedback mode in SPS.
R2-1708468 38331-005; 3GPP TS 38.331 V0.0.5 (Aug. 2017) Technical Specification; 3rd Generation Partnership Project;; Technical Specification Group Radio Access Network;; NR;; Radio Resource Control (RRC).
R2-1708486 UL grant-free resource configuration; 3GPP TSG-RAN WG2 Meeting#99R2-1708486 Berlin, Germany, Aug. 21-25, 2017 (Revised of R2-1707063); ; Source:vivo ; Title:Discussion on UL grant-free resource configuration; Agenda Item:10.3.1.8.
R2-1708487 HARQ process for UL grant-free; 3GPP TSG-RAN WG2 Meeting#99R2-1708487 Berlin, Germany, Aug. 21-25, 2017 (Revised of R2-1707066); ; Source:vivo ; Title:HARQ process for UL grant-free transmission; Agenda Item:10.3.1.8.
R2-1708488; 3GPP TSG-RAN WG2 Meeting#99; Berlin, Germany, Aug. 21-25, 2017; ; Source:vivo; Title:Collision Between Grant-based and Grant-free Resources on the Same UL Carrier; Agenda Item:10.3.1.8.
R2-1708732 (R15 NR WI AI10318 SPSgrantfree); 3GPP TSG-RAN WG2 #99R2-1708732 Berlin, Germany, Aug. 21-25, 2017; Agenda Item:10.3.1.8; Source:InterDigital; Title:SPS and grant free operation; Document for:Discussion, Decision.
R2-1708767 Unified SPS and Grant-free operation; 3GPP TSG-RAN WG2 #99R2-1708767 Berlin, Germany, Jun. 21-25, 2017update of R2-1706589; ; ; Agenda item:10.3.1.8; Source:Nokia, Nokia Shanghai Bell.
R2-1708856 Consideration on SPS resource control for NR; 3GPP TSG-RAN WG2 Meeting #99 R2-1708856 Berlin, Germany, Aug. 21-Aug. 25, 2017; ; ; Agenda item:10.3.1.8 (NR_newRAT-Core); Source:LG Electronics Inc.
R2-1708956 Consideations on SPS and TTI-bundling in EN-DC; 3GPP TSG-RAN WG2 Meeting #99R2-1708956 Berlin, Germany, Aug. 21-25, 2017; ; Agenda Item:10.2.2.4; Source: Huawei, HiSilicon; Title:Considerations on SPS and TTI-bundling in EN-DC.
R2-1709125 On reliable transmission of URLLC data; 3GPP TSG-RAN WG2 Meeting RAN2 #99R2-1709125 Berlin, Germany Aug. 21-25, 2017; ; Agenda item:10.3.1.8; Source:Qualcomm; Title:On reliable transmission of URLLC data.
R2-1709154 Collision control in use of grant free transmission; 3GPP TSG-RAN WG2 Meeting #99R2-1709154 Berlin, Germany, Aug. 21-25, 2017resubmission of R2-1707226; ; ; Agenda Item: 10.3.1.8 (NR_newRAT-Core) Source: LG Electronics Inc.
R2-1709228 __ Grant-free transmissions; 3GPP TSG RAN WG2 Meeting #99R2-1709228 Berlin, Germany, Aug. 21-25, 2017; ; ; ; Source:TCL Communication.
R2-1709235 Retransmission Aspects for Uplink SPS; 3GPP TSG-RAN WG2#99 MeetingR2-1709235 Berlin, Germany, Aug. 21-25, 2017; ; Agenda item:10.3.1.8; Source: Samsung; Title: Retransmission Aspects for Uplink SPS.
R2-1709262 Further discussion on the modelling of grant-free; 3GPP TSG-RAN WG2 Meeting #99R2-1709262 Berlin, Germany, Aug. 21-25, 2017; Source: Huawei, HiSilicon; Title: Further discussion on the modelling of grant-free; Agenda Item:10.3.1.8; Document for:Discussion and decision.

* cited by examiner

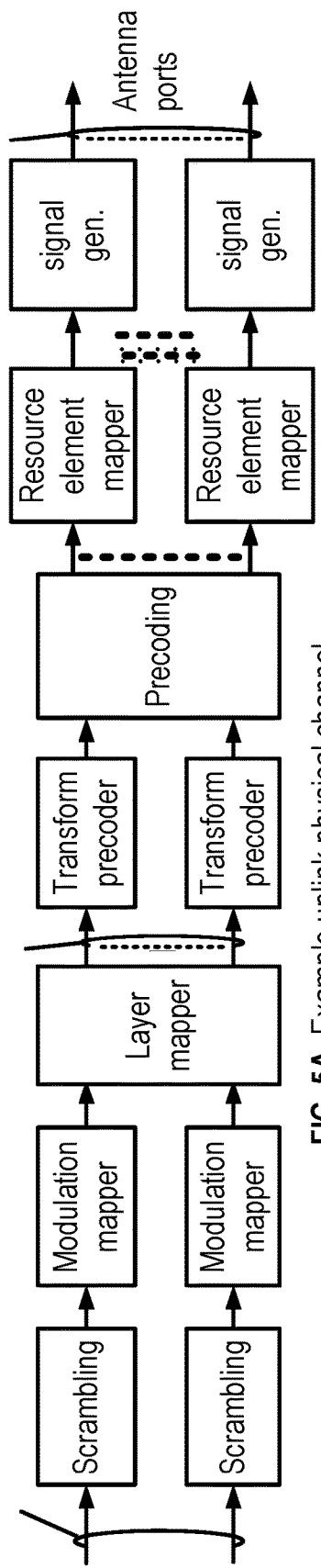
FIG. 5A Example uplink physical channel
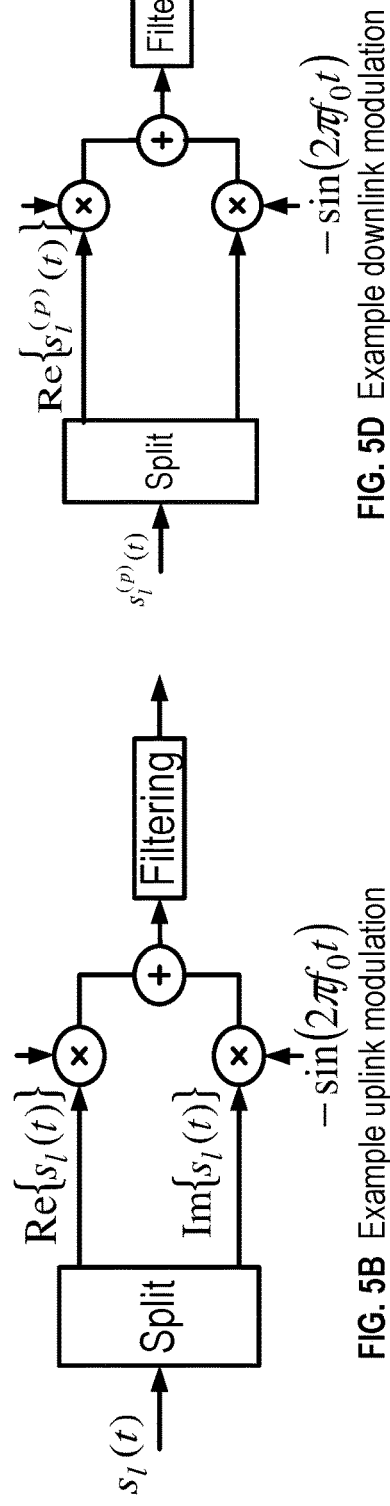
FIG. 5B Example uplink modulation
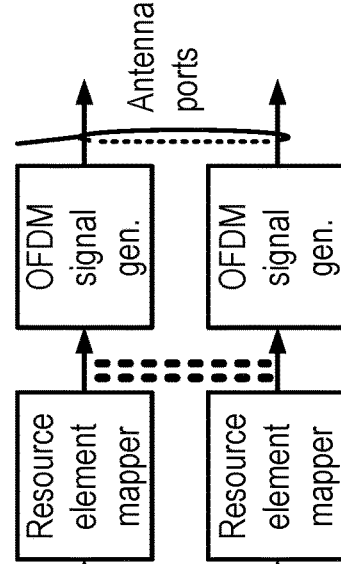
FIG. 5D Example downlink modulation
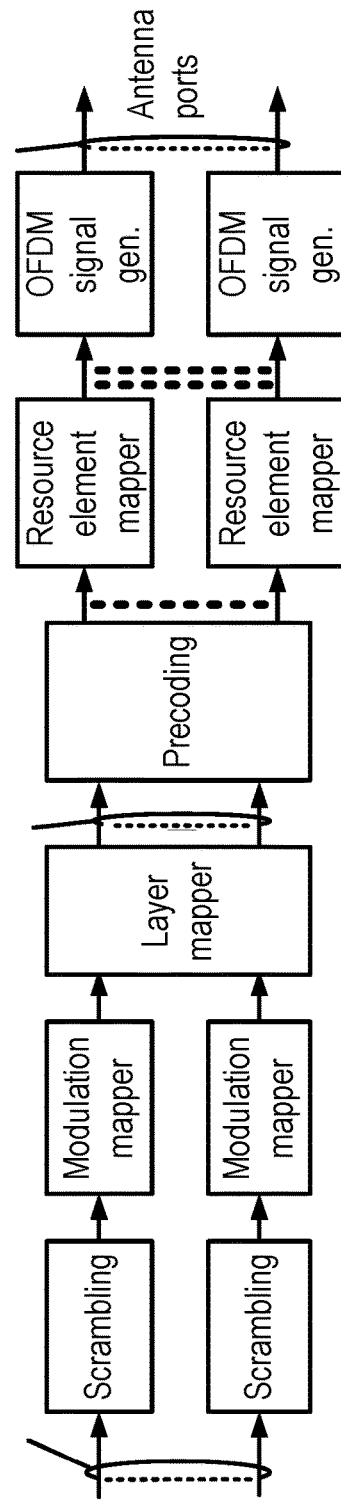
FIG. 5C Example downlink physical channel FIG. 7 Dual-Connectivity- two MAC entities at UE side Example 1: 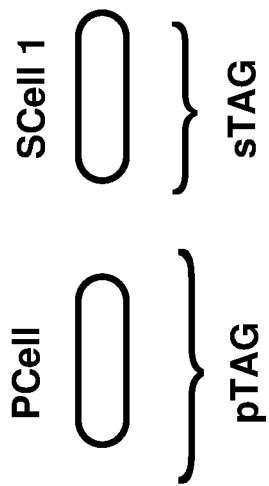
Example 2: 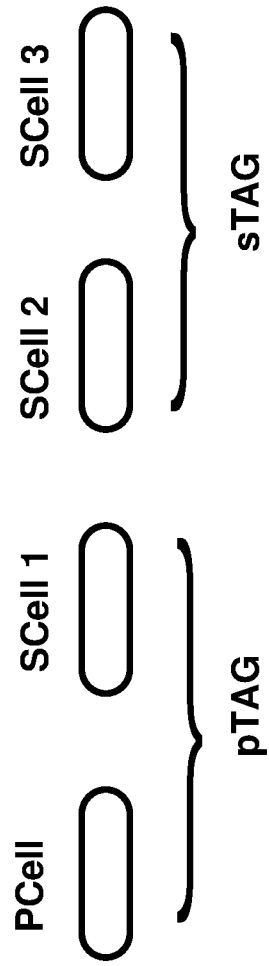
Example 3: 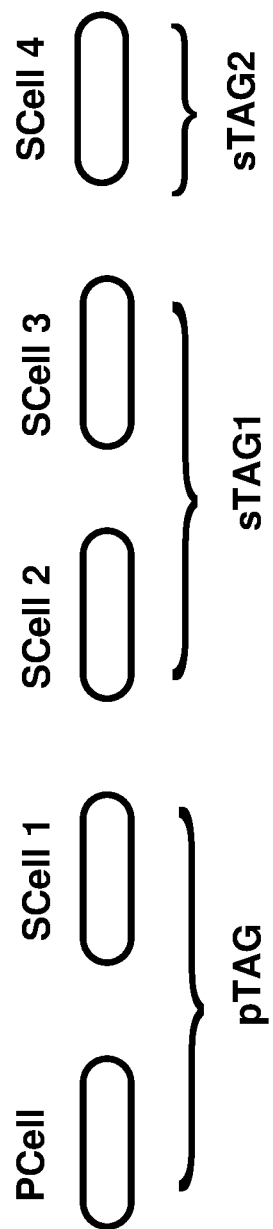
FIG. 8

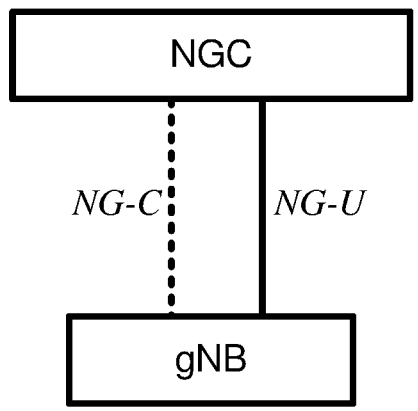
FIG. 10A gNB connected to NGC
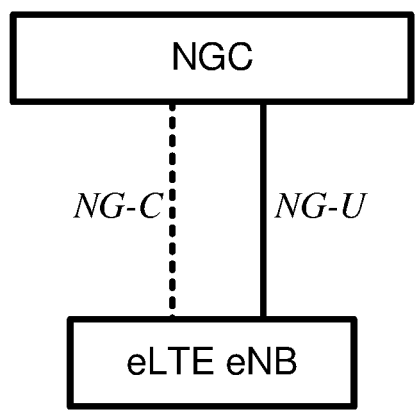
FIG. 10B eLTE eNB connected to NGC

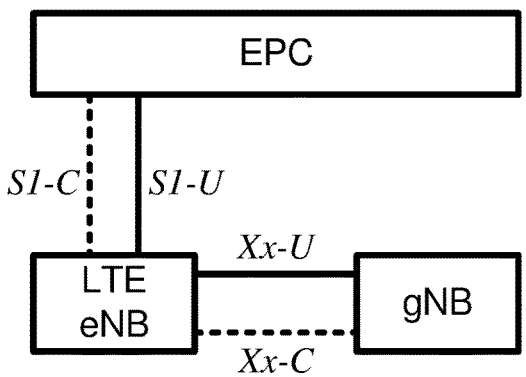

FIG. 11A LTE eNB connected to EPC with non-standalone gNB. gNB user plane connected to EPC via LTE eNB.

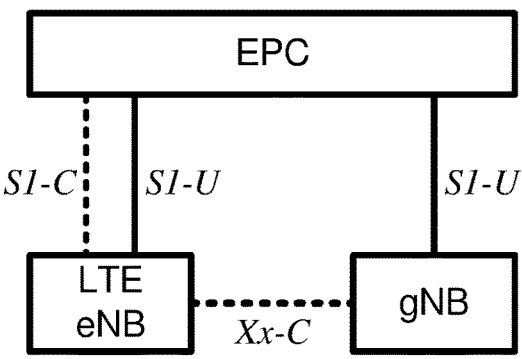

FIG. 11B LTE eNB connected to EPC with non-standalone gNB. gNB user plane connected to EPC directly.

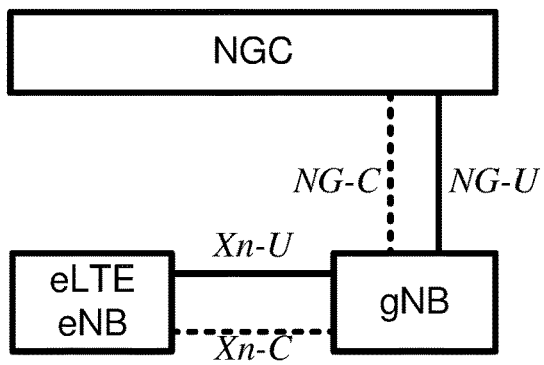

FIG. 11C gNB connected to NGC with non-standalone eLTE eNB. eLTE eNB user plane connected to NGC via gNB.

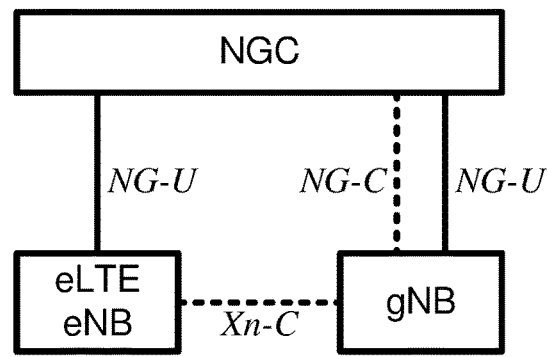

FIG. 11D gNB connected to NGC with non-standalone eLTE eNB. eLTE eNB user plane connected to NGC directly.

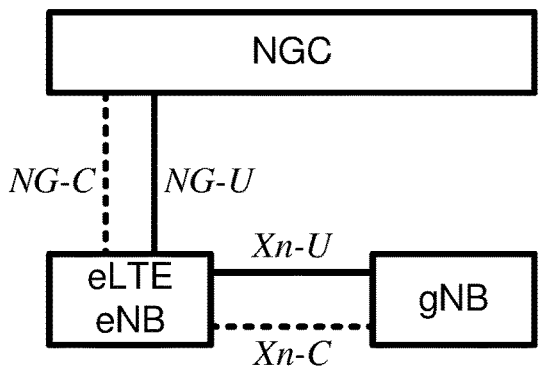

FIG. 11E eLTE eNB connected to NGC with non-standalone gNB. gNB user plane connected to NGC via eLTE eNB.

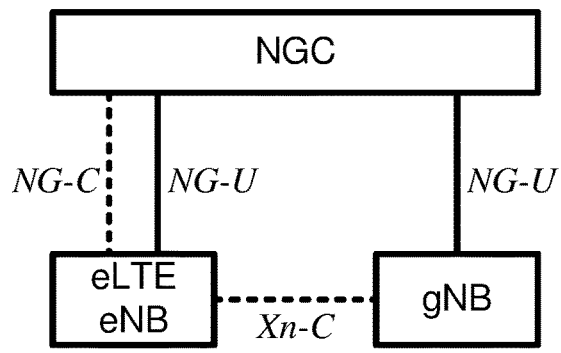

FIG. 11F eLTE eNB connected to NGC with non-standalone gNB. gNB user plane connected to NGC directly.

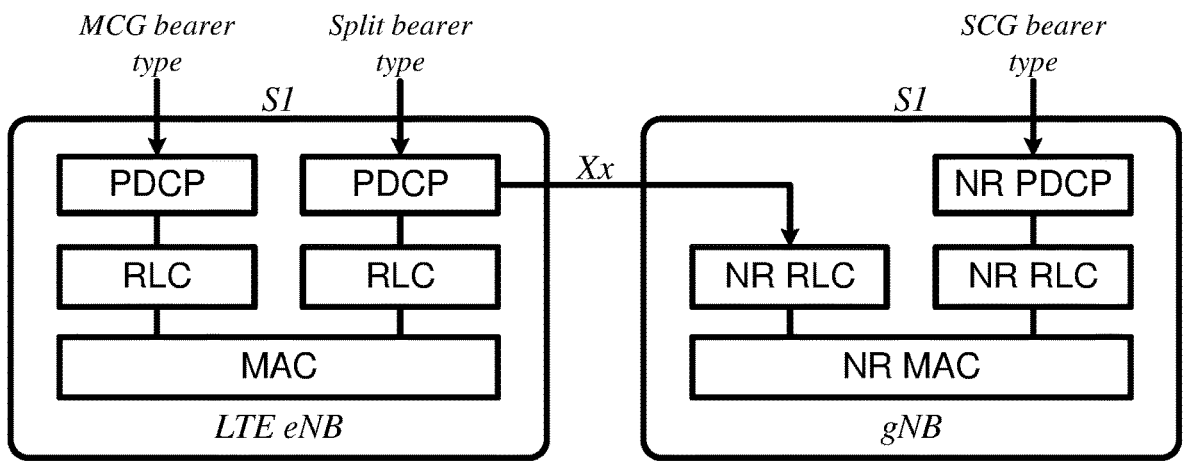
FIG. 12A Radio protocol architecture for split bearer and SCG bearer. LTE eNB connected to EPC with non-standalone gNB.
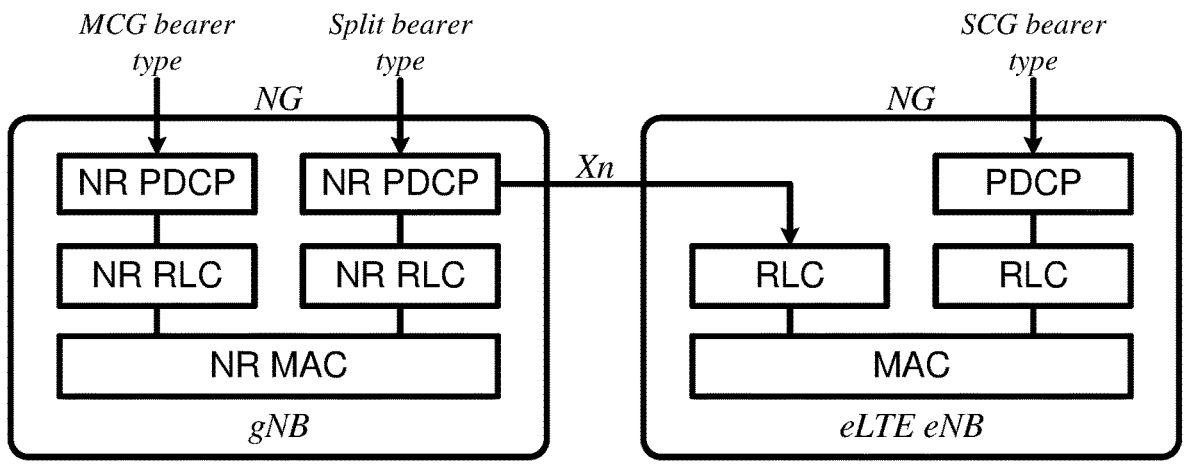
FIG. 12B Radio protocol architecture for split bearer and SCG bearer. gNB connected to NGC with non-standalone eLTE eNB.
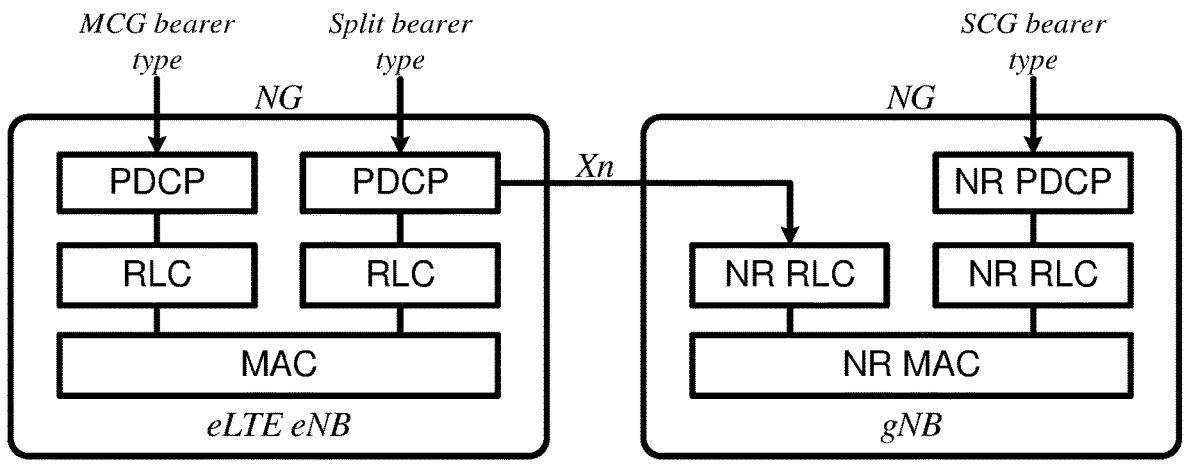
FIG. 12C Radio protocol architecture for split bearer and SCG bearer. eLTE eNB connected to NGC with non-standalone gNB.

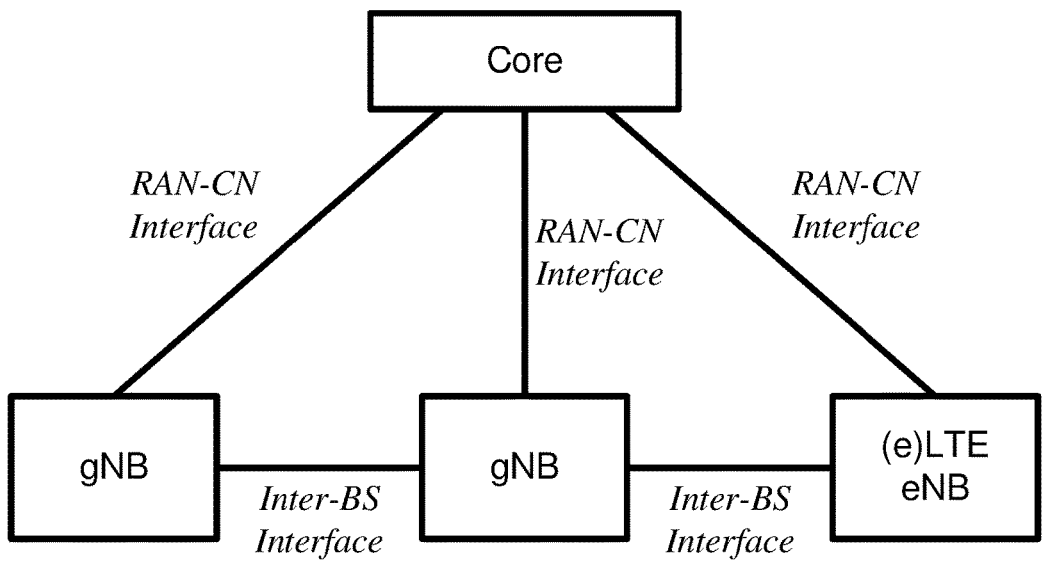
FIG. 13A Non-centralized deployment
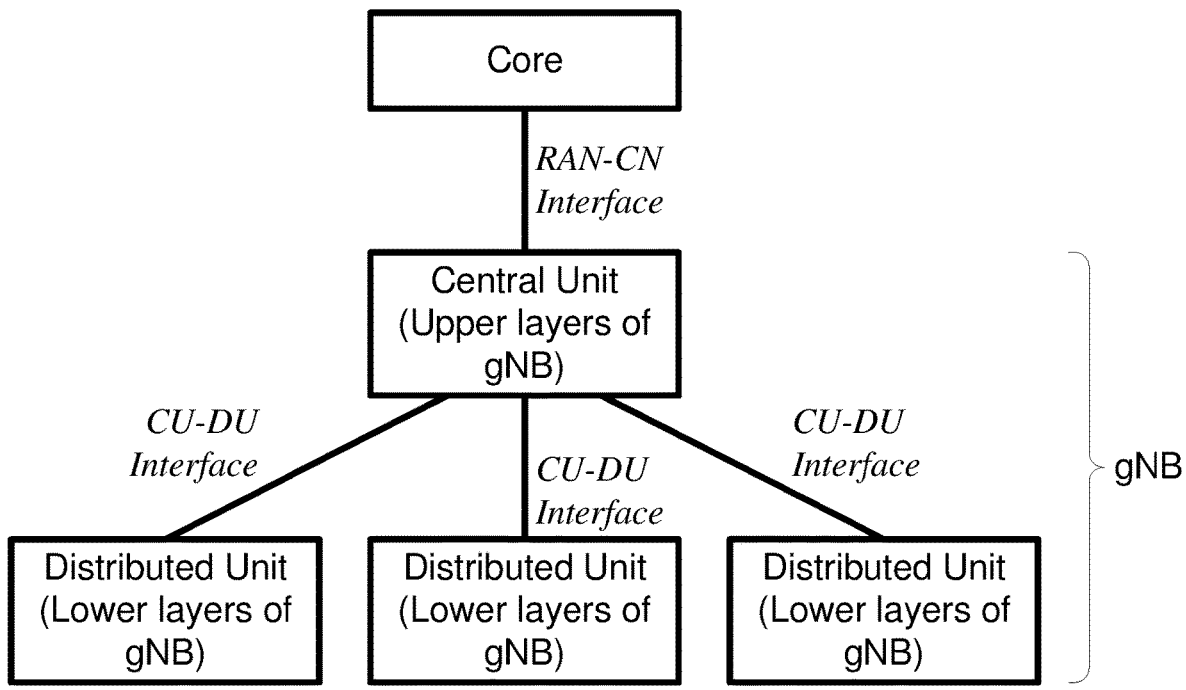
FIG. 13B Centralized deployment

RESOURCE SELECTION FOR DATA MULTIPLEXING

This application claims the benefit of U.S. Provisional Application No. 62/555,374, filed Sep. 7, 2017, and U.S. Provisional Application No. 62/563,256, filed Sep. 26, 2017, which are hereby incorporated by reference in their entirety.

BRIEF DESCRIPTION OF THE SEVERAL VIEWS OF THE DRAWINGS

Examples of several of the various embodiments of the present invention are described herein with reference to the drawings.

FIG. 5A, FIG. 5B, FIG. 5C and FIG. 5D are example diagrams for uplink and downlink signal transmission as per an aspect of an embodiment of the present invention.

FIG. 8 shows example TAG configurations as per an aspect of an embodiment of the present invention.

FIG. 10A and FIG. 10B are example diagrams for interfaces between a 5G core network (e.g. NGC) and base stations (e.g. gNB and eLTE eNB) as per an aspect of an embodiment of the present invention.

FIG. 11A, FIG. 11B, FIG. 11C, FIG. 11D, FIG. 11E, and FIG. 11F are example diagrams for architectures of tight interworking between 5G RAN (e.g. gNB) and LTE RAN (e.g. (e)LTE eNB) as per an aspect of an embodiment of the present invention.

FIG. 12A, FIG. 12B, and FIG. 12C are example diagrams for radio protocol structures of tight interworking bearers as per an aspect of an embodiment of the present invention.

FIG. 13A and FIG. 13B are example diagrams for gNB deployment scenarios as per an aspect of an embodiment of the present invention.

DETAILED DESCRIPTION OF EMBODIMENTS

Figure 1:
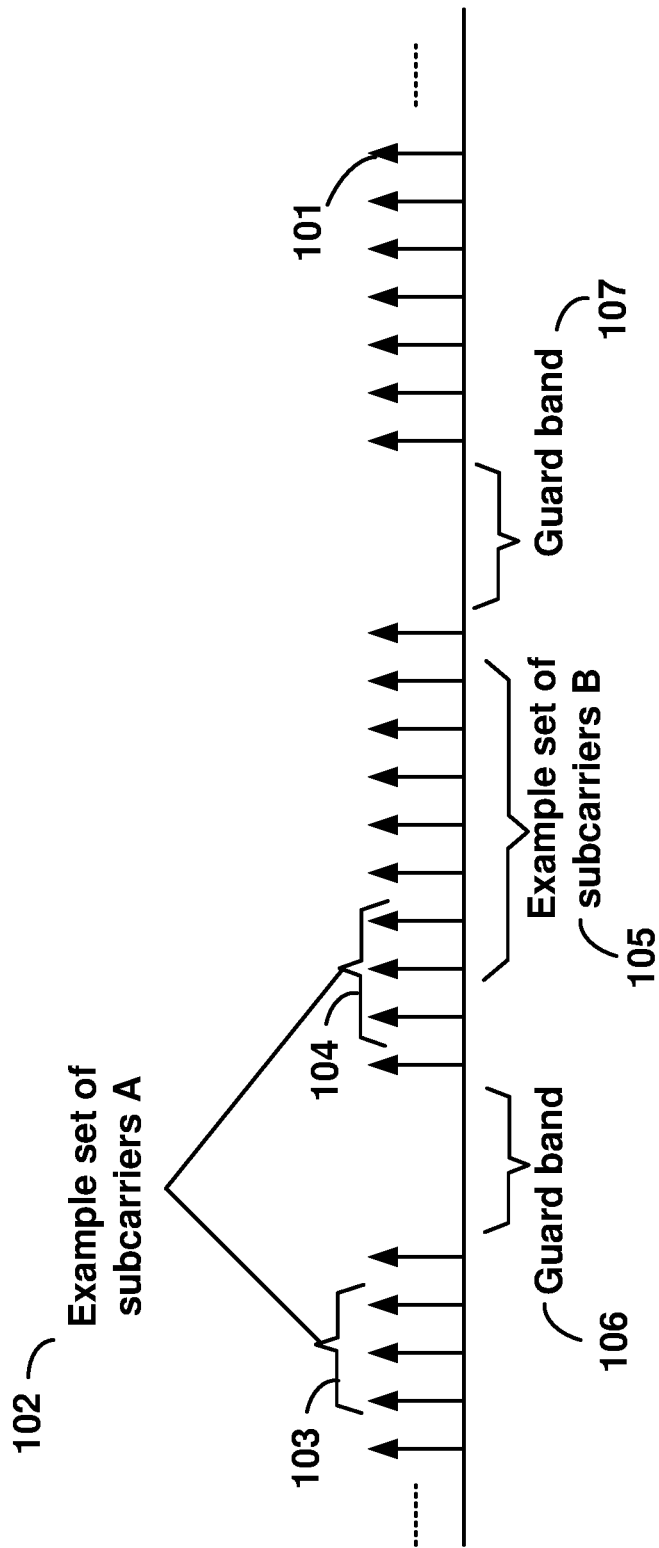
FIG. 1 is a diagram depicting example sets of OFDM subcarriers as per an aspect of an embodiment of the present invention.

Example embodiments of the present invention enable operation of carrier aggregation. Embodiments of the technology disclosed herein may be employed in the technical field of multicarrier communication systems. More particularly, the embodiments of the technology disclosed herein may relate to resource selection and HARQ feedback determination in a multicarrier communication system.

The following Acronyms are used throughout the present disclosure:

ASIC application-specific integrated circuit
BPSK binary phase shift keying
CA carrier aggregation
CSI channel state information
CDMA code division multiple access
CSS common search space
CPLD complex programmable logic devices
CC component carrier
CP cyclic prefix
DL downlink
DCI downlink control information
DC dual connectivity
eMBB enhanced mobile broadband
EPC evolved packet core
E-UTRAN evolved-universal terrestrial radio access network
FPGA field programmable gate arrays
FDD frequency division multiplexing
HDL hardware description languages
HARQ hybrid automatic repeat request
IE information element
LTE long term evolution
MCG master cell group
MeNB master evolved node B
MIB master information block
MAC media access control
MAC media access control
MME mobility management entity
mMTC massive machine type communications
NAS non-access stratum
NR new radio
OFDM orthogonal frequency division multiplexing
PDCP packet data convergence protocol
PDU packet data unit
PHY physical
PDCCH physical downlink control channel
PHICH physical HARQ indicator channel
PUCCH physical uplink control channel
PUSCH physical uplink shared channel
PCell primary cell
PCell primary cell
PCC primary component carrier
PSCell primary secondary cell
pTAG primary timing advance group
QAM quadrature amplitude modulation
QPSK quadrature phase shift keying
RBG resource block groups
RLC radio link control
RRC radio resource control RA random access
RB resource blocks
SCC secondary component carrier
SCell secondary cell
Scell secondary cells
SCG secondary cell group
SeNB secondary evolved node B
sTAGs secondary timing advance group
SDU service data unit
S-GW serving gateway
SRB signaling radio bearer
SC-OFDM single carrier-OFDM
SFN system frame number
SIB system information block
TAI tracking area identifier
TAT time alignment timer
TDD time division duplexing
TDMA time division multiple access
TA timing advance
TAG timing advance group
TTI transmission time intervalTB transport block
UL uplink
UE user equipment
URLLC ultra-reliable low-latency communications
VHDL VHSIC hardware description language
CU central unit
DU distributed unit
Fs-C Fs-control plane
Fs-U Fs-user plane
gNB next generation node B
NGC next generation core
NG CP next generation control plane core
NG-C NG-control plane
NG-U NG-user plane
NR new radio
NR MAC new radio MAC
NR PHY new radio physical
NR PDCP new radio PDCP
NR RLC new radio RLC
NR RRC new radio RRC
NSSAI network slice selection assistance information
PLMN public land mobile network
UPGW user plane gateway
Xn-C Xn-control plane
Xn-U Xn-user plane
Xx-C Xx-control plane
Xx-U Xx-user plane Example embodiments of the invention may be implemented using various physical layer modulation and transmission mechanisms. Example transmission mechanisms may include, but are not limited to: CDMA, OFDM, TDMA, Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement QAM using BPSK, QPSK, 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is a diagram depicting example sets of OFDM subcarriers as per an aspect of an embodiment of the present invention. As illustrated in this example, arrow(s) in the diagram may depict a subcarrier in a multicarrier OFDM system. The OFDM system may use technology such as OFDM technology, DFTS-OFDM, SC-OFDM technology, or the like. For example, arrow 101 shows a subcarrier transmitting information symbols. FIG. 1 is for illustration purposes, and a typical multicarrier OFDM system may include more subcarriers in a carrier. For example, the number of subcarriers in a carrier may be in the range of 10 to 10,000 subcarriers. FIG. 1 shows two guard bands 106 and 107 in a transmission band. As illustrated in FIG. 1, guard band 106 is between subcarriers 103 and subcarriers 104. The example set of subcarriers A 102 includes subcarriers 103 and subcarriers 104. FIG. 1 also illustrates an example set of subcarriers B 105. As illustrated, there is no guard band between any two subcarriers in the example set of subcarriers B 105. Carriers in a multicarrier OFDM communication system may be contiguous carriers, non-contiguous carriers, or a combination of both contiguous and non-contiguous carriers.

Figure 2:
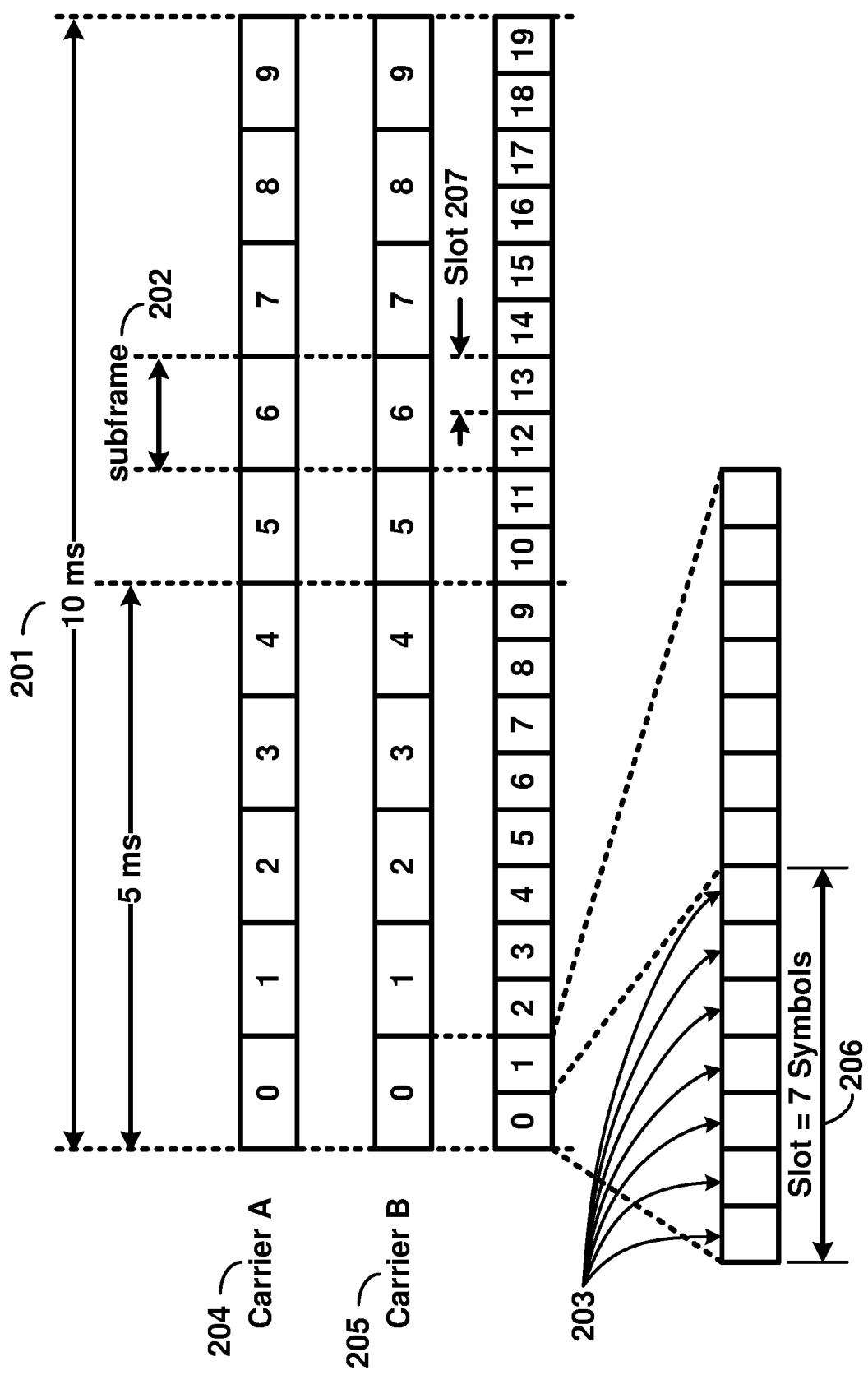
FIG. 2 is a diagram depicting an example transmission time and reception time for two carriers in a carrier group as per an aspect of an embodiment of the present invention.

FIG. 2 is a diagram depicting an example transmission time and reception time for two carriers as per an aspect of an embodiment of the present invention. A multicarrier OFDM communication system may include one or more carriers, for example, ranging from 1 to 10 carriers. Carrier A 204 and carrier B 205 may have the same or different timing structures. Although FIG. 2 shows two synchronized carriers, carrier A 204 and carrier B 205 may or may not be synchronized with each other. Different radio frame structures may be supported for FDD and TDD duplex mechanisms. FIG. 2 shows an example FDD frame timing. Downlink and uplink transmissions may be organized into radio frames 201. In this example, radio frame duration is 10 msec. Other frame durations, for example, in the range of 1 to 100 msec may also be supported. In this example, each 10 ms radio frame 201 may be divided into ten equally sized subframes 202. Other subframe durations such as including 0.5 msec, 1 msec, 2 msec, and 5 msec may also be supported. Subframe(s) may consist of two or more slots (e.g. slots 206 and 207). For the example of FDD, 10 subframes may be available for downlink transmission and 10 subframes may be available for uplink transmissions in each 10 ms interval. Uplink and downlink transmissions may be separated in the frequency domain. A slot may be 7 or 14 OFDM symbols for the same subcarrier spacing of up to 60 kHz with normal CP. A slot may be 14 OFDM symbols for the same subcarrier spacing higher than 60 kHz with normal CP. A slot may contain all downlink, all uplink, or a downlink part and an uplink part and/or alike. Slot aggregation may be supported, e.g., data transmission may be scheduled to span one or multiple slots. In an example, a mini-slot may start at an OFDM symbol in a subframe. A mini-slot may have a duration of one or more OFDM symbols. Slot(s) may include a plurality of OFDM symbols 203. The number of OFDM symbols 203 in a slot 206 may depend on the cyclic prefix length and subcarrier spacing.

Figure 3:
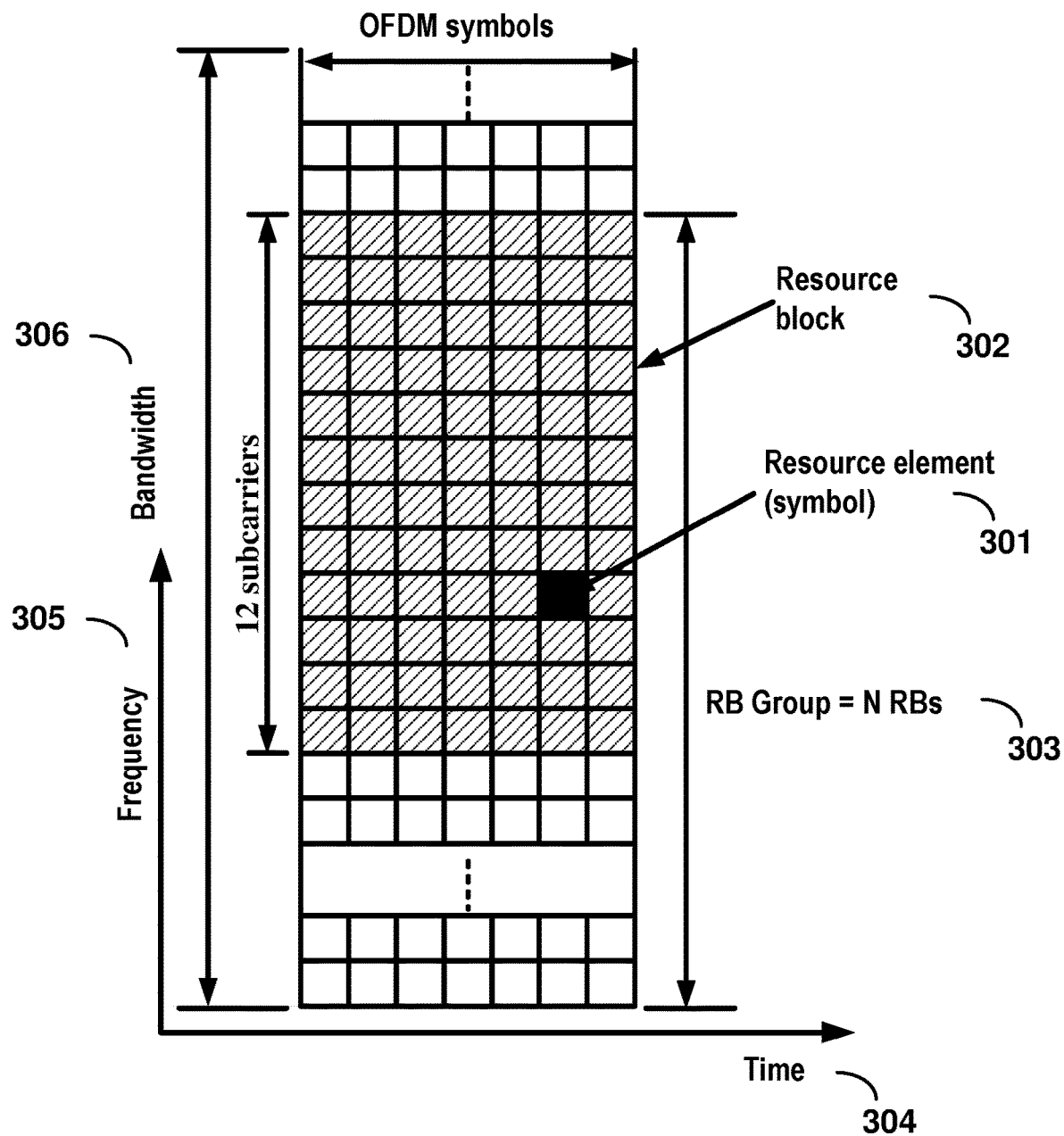
FIG. 3 is a diagram depicting OFDM radio resources as per an aspect of an embodiment of the present invention.

FIG. 3 is a diagram depicting OFDM radio resources as per an aspect of an embodiment of the present invention. The resource grid structure in time 304 and frequency 305 is illustrated in FIG. 3. The quantity of downlink subcarriers or RBs may depend, at least in part, on the downlink transmission bandwidth 306 configured in the cell. The smallest radio resource unit may be called a resource element (e.g. 301). Resource elements may be grouped into resource blocks (e.g. 302). Resource blocks may be grouped into larger radio resources called Resource Block Groups (RBG) (e.g. 303). The transmitted signal in slot 206 may be described by one or several resource grids of a plurality of subcarriers and a plurality of OFDM symbols. Resource blocks may be used to describe the mapping of certain physical channels to resource elements. Other pre-defined groupings of physical resource elements may be implemented in the system depending on the radio technology. For example, 24 subcarriers may be grouped as a radio block for a duration of 5 msec. In an illustrative example, a resource block may correspond to one slot in the time domain and 180 kHz in the frequency domain (for 15 KHz subcarrier bandwidth and 12 subcarriers).

In an example embodiment, multiple numerologies may be supported. In an example, a numerology may be derived by scaling a basic subcarrier spacing by an integer N. In an example, scalable numerology may allow at least from 15 kHz to 480 kHz subcarrier spacing. The numerology with 15 kHz and scaled numerology with different subcarrier spacing with the same CP overhead may align at a symbol boundary every 1 ms in a NR carrier.

FIG. 5A, FIG. 5B, FIG. 5C and FIG. 5D are example diagrams for uplink and downlink signal transmission as per an aspect of an embodiment of the present invention. FIG. 5A shows an example uplink physical channel. The baseband signal representing the physical uplink shared channel may perform the following processes. These functions are illustrated as examples and it is anticipated that other mechanisms may be implemented in various embodiments. The functions may comprise scrambling, modulation of scrambled bits to generate complex-valued symbols, mapping of the complex-valued modulation symbols onto one or several transmission layers, transform precoding to generate complex-valued symbols, precoding of the complex-valued symbols, mapping of precoded complex-valued symbols to resource elements, generation of complex-valued time-domain DFTS-OFDM/SC-FDMA signal for each antenna port, and/or the like.

Example modulation and up-conversion to the carrier frequency of the complex-valued DFTS-OFDM/SC-FDMA baseband signal for each antenna port and/or the complex-valued PRACH baseband signal is shown in FIG. 5B. Filtering may be employed prior to transmission.

An example structure for Downlink Transmissions is shown in FIG. 5C. The baseband signal representing a downlink physical channel may perform the following processes. These functions are illustrated as examples and it is anticipated that other mechanisms may be implemented in various embodiments. The functions include scrambling of coded bits in each of the codewords to be transmitted on a physical channel; modulation of scrambled bits to generate complex-valued modulation symbols; mapping of the complex-valued modulation symbols onto one or several transmission layers; precoding of the complex-valued modulation symbols on each layer for transmission on the antenna ports; mapping of complex-valued modulation symbols for each antenna port to resource elements; generation of complex-valued time-domain OFDM signal for each antenna port, and/or the like.

Example modulation and up-conversion to the carrier frequency of the complex-valued OFDM baseband signal for each antenna port is shown in FIG. 5D. Filtering may be employed prior to transmission.

Figure 4:
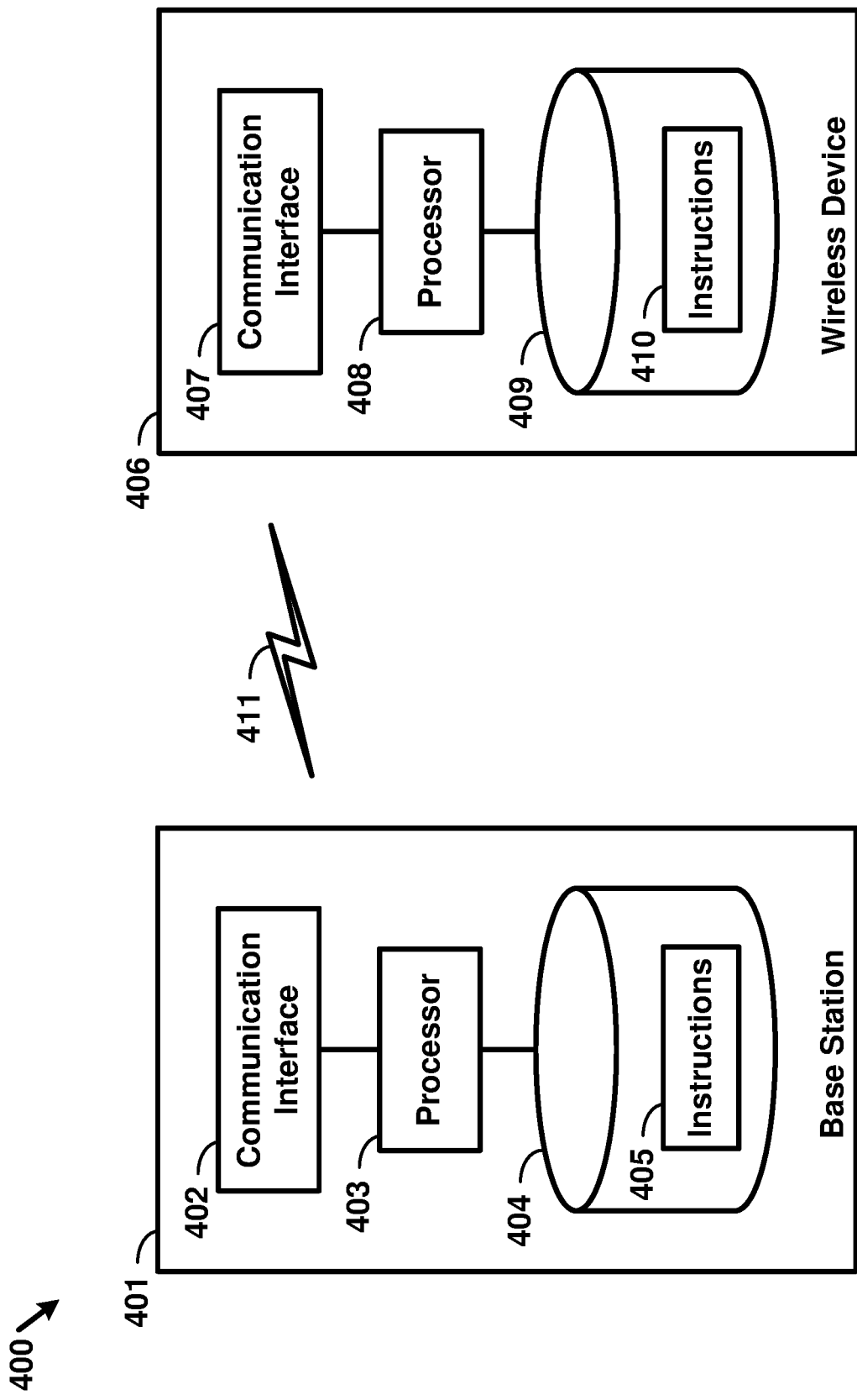
FIG. 4 is a block diagram of a base station and a wireless device as per an aspect of an embodiment of the present invention.

FIG. 4 is an example block diagram of a base station 401 and a wireless device 406, as per an aspect of an embodiment of the present invention. A communication network 400 may include at least one base station 401 and at least one wireless device 406. The base station 401 may include at least one communication interface 402, at least one processor 403, and at least one set of program code instructions 405 stored in non-transitory memory 404 and executable by the at least one processor 403. The wireless device 406 may include at least one communication interface 407, at least one processor 408, and at least one set of program code instructions 410 stored in non-transitory memory 409 and executable by the at least one processor 408. Communication interface 402 in base station 401 may be configured to engage in communication with communication interface 407 in wireless device 406 via a communication path that includes at least one wireless link 411. Wireless link 411 may be a bi-directional link. Communication interface 407 in wireless device 406 may also be configured to engage in a communication with communication interface 402 in base station 401. Base station 401 and wireless device 406 may be configured to send and receive data over wireless link 411 using multiple frequency carriers. According to some of the various aspects of embodiments, transceiver(s) may be employed. A transceiver is a device that includes both a transmitter and receiver. Transceivers may be employed in devices such as wireless devices, base stations, relay nodes, and/or the like. Example embodiments for radio technology implemented in communication interface 402, 407 and wireless link 411 are illustrated are FIG. 1, FIG. 2, FIG. 3, FIG. 5, and associated text.

An interface may be a hardware interface, a firmware interface, a software interface, and/or a combination thereof. The hardware interface may include connectors, wires, electronic devices such as drivers, amplifiers, and/or the like. A software interface may include code stored in a memory device to implement protocol(s), protocol layers, communication drivers, device drivers, combinations thereof, and/or the like. A firmware interface may include a combination of embedded hardware and code stored in and/or in communication with a memory device to implement connections, electronic device operations, protocol(s), protocol layers, communication drivers, device drivers, hardware operations, combinations thereof, and/or the like.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics in the device, whether the device is in an operational or non-operational state.

According to some of the various aspects of embodiments, a 5G network may include a multitude of base stations, providing a user plane NR PDCP/NR RLC/NR MAC/NR PHY and control plane (NR RRC) protocol terminations towards the wireless device. The base station(s) may be interconnected with other base station(s) (e.g. employing an Xn interface). The base stations may also be connected employing, for example, an NG interface to an NGC. FIG. 10A and FIG. 10B are example diagrams for interfaces between a 5G core network (e.g. NGC) and base stations (e.g. gNB and eLTE eNB) as per an aspect of an embodiment of the present invention. For example, the base stations may be interconnected to the NGC control plane (e.g. NG CP) employing the NG-C interface and to the NGC user plane (e.g. UPGW) employing the NG-U interface. The NG interface may support a many-to-many relation between 5G core networks and base stations.

A base station may include many sectors for example: 1, 2, 3, 4, or 6 sectors. A base station may include many cells, for example, ranging from 1 to 50 cells or more. A cell may be categorized, for example, as a primary cell or secondary cell. At RRC connection establishment/re-establishment/ handover, one serving cell may provide the NAS (non-access stratum) mobility information (e.g. TAI), and at RRC connection re-establishment/handover, one serving cell may provide the security input. This cell may be referred to as the Primary Cell (PCell). In the downlink, the carrier corresponding to the PCell may be the Downlink Primary Component Carrier (DL PCC), while in the uplink, it may be the Uplink Primary Component Carrier (UL PCC). Depending on wireless device capabilities, Secondary Cells (SCells) may be configured to form together with the PCell a set of serving cells. In the downlink, the carrier corresponding to an SCell may be a Downlink Secondary Component Carrier (DL SCC), while in the uplink, it may be an Uplink Secondary Component Carrier (UL SCC). An SCell may or may not have an uplink carrier.

A cell, comprising a downlink carrier and optionally an uplink carrier, may be assigned a physical cell ID and a cell index. A carrier (downlink or uplink) may belong to only one cell. The cell ID or Cell index may also identify the downlink carrier or uplink carrier of the cell (depending on the context it is used). In the specification, cell ID may be equally referred to a carrier ID, and cell index may be referred to carrier index. In implementation, the physical cell ID or cell index may be assigned to a cell. A cell ID may be determined using a synchronization signal transmitted on a downlink carrier. A cell index may be determined using RRC messages. For example, when the specification refers to a first physical cell ID for a first downlink carrier, the specification may mean the first physical cell ID is for a cell comprising the first downlink carrier. The same concept may apply to, for example, carrier activation. When the specification indicates that a first carrier is activated, the specification may equally mean that the cell comprising the first carrier is activated.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices may support multiple technologies, and/or multiple releases of the same technology. Wireless devices may have some specific capability(ies) depending on its wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of wireless devices in a coverage area that may not comply with the disclosed methods, for example, because those wireless devices perform based on older releases of LTE or 5G technology.

Figure 6:
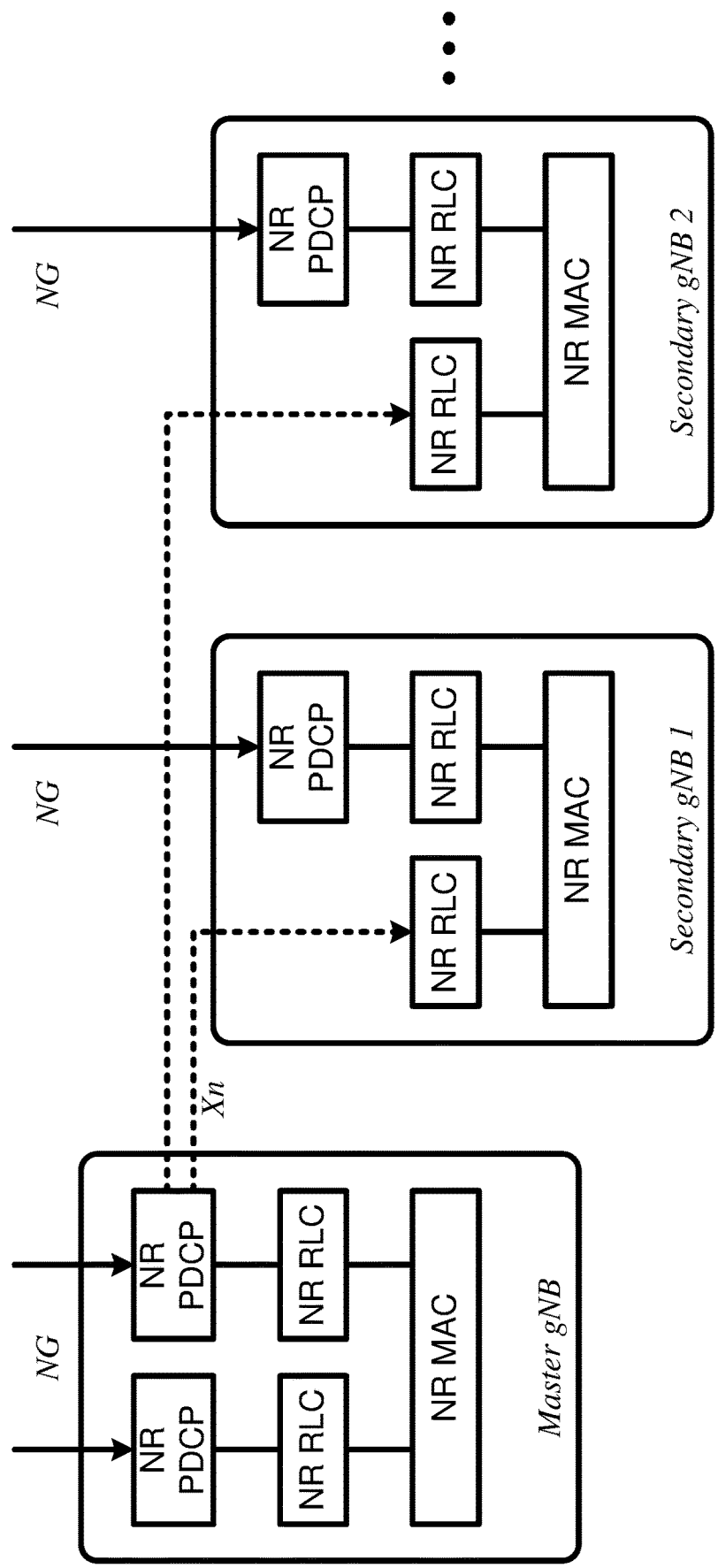
FIG. 6 is an example diagram for a protocol structure with multi-connectivity as per an aspect of an embodiment of the present invention.
Figure 7:
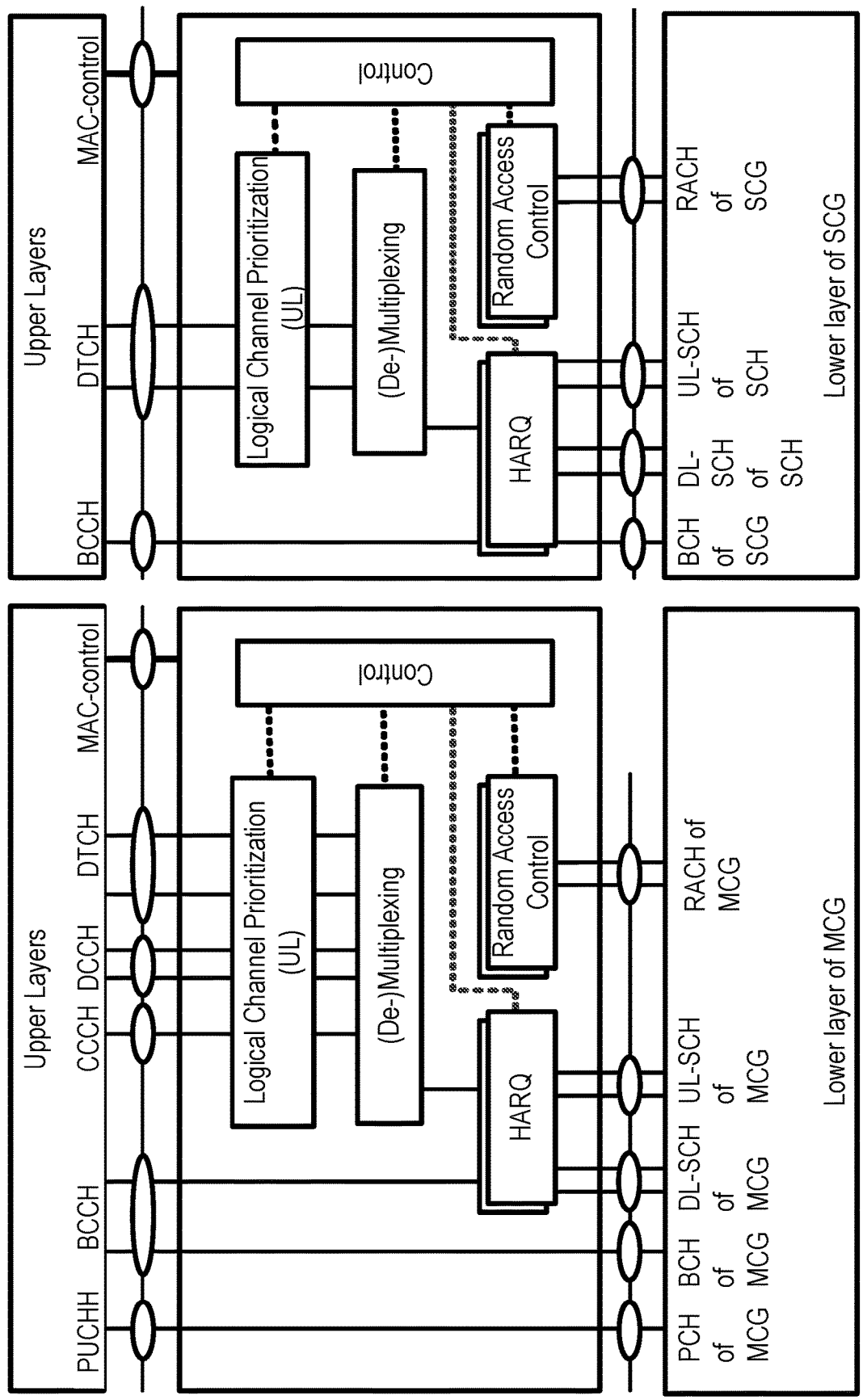
FIG. 7 is an example diagram for a protocol structure with CA and DC as per an aspect of an embodiment of the present invention.

FIG. 6 and FIG. 7 are example diagrams for protocol structure with CA and multi-connectivity as per an aspect of an embodiment of the present invention. NR may support multi-connectivity operation whereby a multiple RX/TX UE in RRC_CONNECTED may be configured to utilize radio resources provided by multiple schedulers located in multiple gNBs connected via a non-ideal or ideal backhaul over the Xn interface. gNBs involved in multi-connectivity for a certain UE may assume two different roles: a gNB may either act as a master gNB or as a secondary gNB. In multi-connectivity, a UE may be connected to one master gNB and one or more secondary gNBs. FIG. 7 illustrates one example structure for the UE side MAC entities when a Master Cell Group (MCG) and a Secondary Cell Group (SCG) are configured, and it may not restrict implementation. Media Broadcast Multicast Service (MBMS) reception is not shown in this figure for simplicity.

In multi-connectivity, the radio protocol architecture that a particular bearer uses may depend on how the bearer is setup. Three alternatives may exist, an MCG bearer, an SCG bearer and a split bearer as shown in FIG. 6. NR RRC may be located in master gNB and SRBs may be configured as a MCG bearer type and may use the radio resources of the master gNB. Multi-connectivity may also be described as having at least one bearer configured to use radio resources provided by the secondary gNB. Multi-connectivity may or may not be configured/implemented in example embodiments of the invention.

In the case of multi-connectivity, the UE may be configured with multiple NR MAC entities: one NR MAC entity for master gNB, and other NR MAC entities for secondary gNBs. In multi-connectivity, the configured set of serving cells for a UE may comprise of two subsets: the Master Cell Group (MCG) containing the serving cells of the master gNB, and the Secondary Cell Groups (SCGs) containing the serving cells of the secondary gNBs. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one Split bearer; upon detection of a physical layer problem or a random access problem on a PSCell, or the maximum number of NR RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master gNB may be informed by the UE of a SCG failure type, for split bearer, the DL data transfer over the master gNB is maintained; the NR RLC AM bearer may be configured for the split bearer; like PCell, PSCell may not be de-activated; PSCell may be changed with a SCG change (e.g. with security key change and a RACH procedure); and/or a direct bearer type change between a Split bearer and a SCG bearer or simultaneous configuration of a SCG and a Split bearer may or may not be supported.

With respect to the interaction between a master gNB and secondary gNBs for multi-connectivity, one or more of the following principles may be applied: the master gNB may maintain the RRM measurement configuration of the UE and may, (e.g, based on received measurement reports or traffic conditions or bearer types), decide to ask a secondary gNB to provide additional resources (serving cells) for a UE;

upon receiving a request from the master gNB, a secondary gNB may create a container that may result in the configuration of additional serving cells for the UE (or decide that it has no resource available to do so); for UE capability coordination, the master gNB may provide (part of) the AS configuration and the UE capabilities to the secondary gNB; the master gNB and the secondary gNB may exchange information about a UE configuration by employing of NR RRC containers (inter-node messages) carried in Xn messages; the secondary gNB may initiate a reconfiguration of its existing serving cells (e.g., PUCCH towards the secondary gNB); the secondary gNB may decide which cell is the PSCell within the SCG; the master gNB may or may not change the content of the NR RRC configuration provided by the secondary gNB; in the case of a SCG addition and a SCG SCell addition, the master gNB may provide the latest measurement results for the SCG cell(s); both a master gNB and secondary gNBs may know the SFN and subframe offset of each other by OAM, (e.g., for the purpose of DRX alignment and identification of a measurement gap). In an example, when adding a new SCG SCell, dedicated NR RRC signaling may be used for sending required system information of the cell as for CA, except for the SFN acquired from a MIB of the PSCell of a SCG.

In an example, serving cells may be grouped in a TA group (TAG). Serving cells in one TAG may use the same timing reference. For a given TAG, user equipment (UE) may use at least one downlink carrier as a timing reference. For a given TAG, a UE may synchronize uplink subframe and frame transmission timing of uplink carriers belonging to the same TAG. In an example, serving cells having an uplink to which the same TA applies may correspond to serving cells hosted by the same receiver. A UE supporting multiple TAs may support two or more TA groups. One TA group may contain the PCell and may be called a primary TAG (pTAG). In a multiple TAG configuration, at least one TA group may not contain the PCell and may be called a secondary TAG (sTAG). In an example, carriers within the same TA group may use the same TA value and/or the same timing reference. When DC is configured, cells belonging to a cell group (MCG or SCG) may be grouped into multiple TAGs including a pTAG and one or more sTAGs.

FIG. 8 shows example TAG configurations as per an aspect of an embodiment of the present invention. In Example 1, pTAG comprises PCell, and an sTAG comprises SCell1. In Example 2, a pTAG comprises a PCell and SCell1, and an sTAG comprises SCell2 and SCell3. In Example 3, pTAG comprises PCell and SCell1, and an sTAG1 includes SCell2 and SCell3, and sTAG2 comprises SCell4. Up to four TAGs may be supported in a cell group (MCG or SCG) and other example TAG configurations may also be provided. In various examples in this disclosure, example mechanisms are described for a pTAG and an sTAG. Some of the example mechanisms may be applied to configurations with multiple sTAGs.

In an example, an eNB may initiate an RA procedure via a PDCCH order for an activated SCell. This PDCCH order may be sent on a scheduling cell of this SCell. When cross carrier scheduling is configured for a cell, the scheduling cell may be different than the cell that is employed for preamble transmission, and the PDCCH order may include an SCell index. At least a non-contention based RA procedure may be supported for SCell(s) assigned to sTAG(s).

Figure 9:
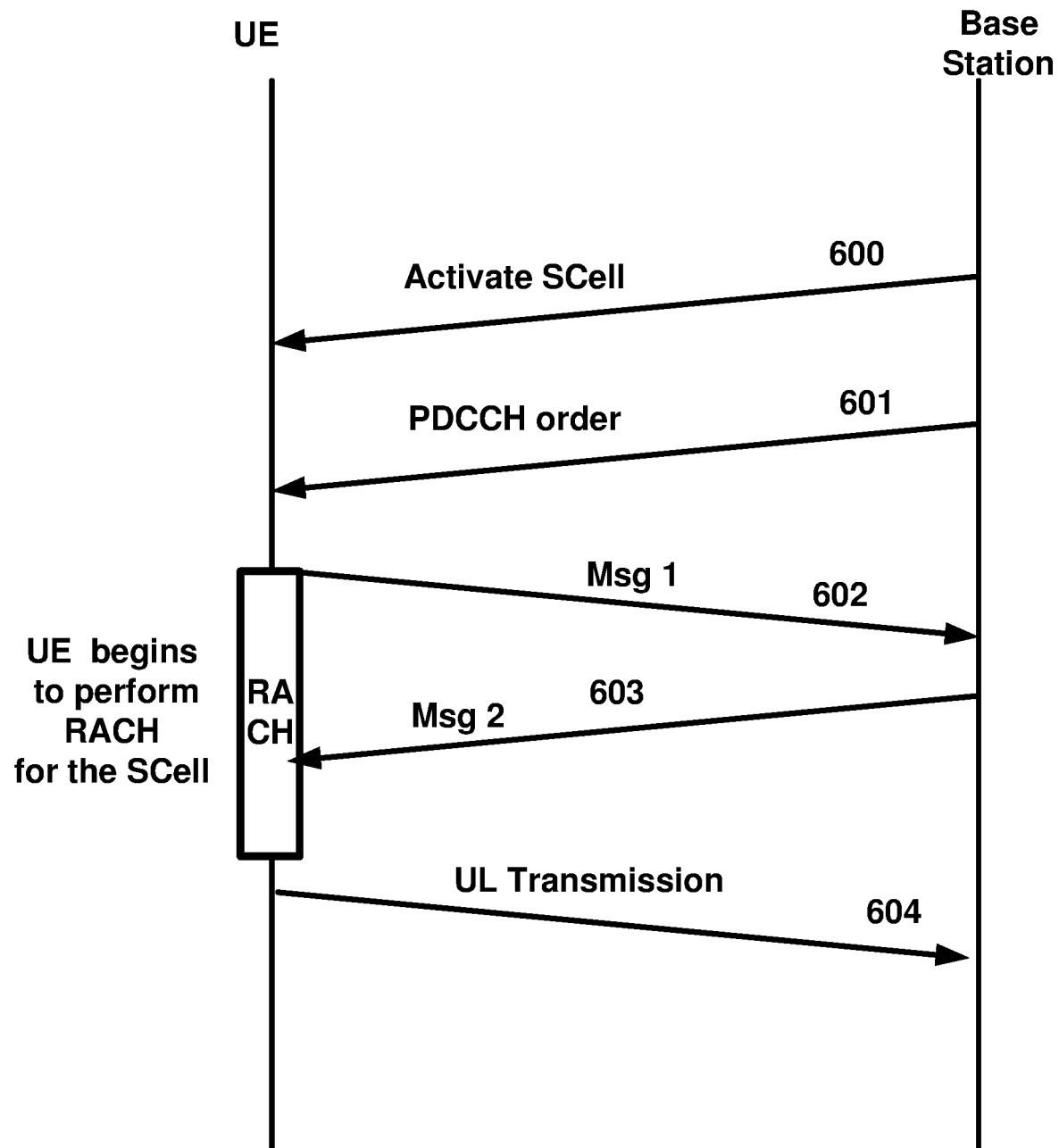
FIG. 9 is an example message flow in a random access process in a secondary TAG as per an aspect of an embodiment of the present invention.

FIG. 9 is an example message flow in a random access process in a secondary TAG as per an aspect of an embodiment of the present invention. An eNB transmits an activation command 600 to activate an SCell. A preamble 602 (Msg1) may be sent by a UE in response to a PDCCH order 601 on an SCell belonging to an sTAG. In an example embodiment, preamble transmission for SCells may be controlled by the network using PDCCH format 1A. Msg2 message 603 (RAR: random access response) in response to the preamble transmission on the SCell may be addressed to RA-RNTI in a PCell common search space (CSS). Uplink packets 604 may be transmitted on the SCell in which the preamble was transmitted.

According to some of the various aspects of embodiments, initial timing alignment may be achieved through a random access procedure. This may involve a UE transmitting a random access preamble and an eNB responding with an initial TA command NTA (amount of timing advance) within a random access response window. The start of the random access preamble may be aligned with the start of a corresponding uplink subframe at the UE assuming NTA=0. The eNB may estimate the uplink timing from the random access preamble transmitted by the UE. The TA command may be derived by the eNB based on the estimation of the difference between the desired UL timing and the actual UL timing. The UE may determine the initial uplink transmission timing relative to the corresponding downlink of the sTAG on which the preamble is transmitted.

The mapping of a serving cell to a TAG may be configured by a serving eNB with RRC signaling. The mechanism for TAG configuration and reconfiguration may be based on RRC signaling. According to some of the various aspects of embodiments, when an eNB performs an SCell addition configuration, the related TAG configuration may be configured for the SCell. In an example embodiment, an eNB may modify the TAG configuration of an SCell by removing (releasing) the SCell and adding (configuring) a new SCell (with the same physical cell ID and frequency) with an updated TAG ID. The new SCell with the updated TAG ID may initially be inactive subsequent to being assigned the updated TAG ID. The eNB may activate the updated new SCell and start scheduling packets on the activated SCell. In an example implementation, it may not be possible to change the TAG associated with an SCell, but rather, the SCell may need to be removed and a new SCell may need to be added with another TAG. For example, if there is a need to move an SCell from an sTAG to a pTAG, at least one RRC message, for example, at least one RRC reconfiguration message, may be send to the UE to reconfigure TAG configurations by releasing the SCell and then configuring the SCell as a part of the pTAG (when an SCell is added/configured without a TAG index, the SCell may be explicitly assigned to the pTAG). The PCell may not change its TA group and may be a member of the pTAG.

The purpose of an RRC connection reconfiguration procedure may be to modify an RRC connection, (e.g. to establish, modify and/or release RBs, to perform handover, to setup, modify, and/or release measurements, to add, modify, and/or release SCells). If the received RRC Connection Reconfiguration message includes the sCellToReleaseList, the UE may perform an SCell release. If the received RRC Connection Reconfiguration message includes the sCellToAddModList, the UE may perform SCell additions or modification.

In LTE Release-10 and Release-11 CA, a PUCCH is only transmitted on the PCell (PSCell) to an eNB. In LTE-Release 12 and earlier, a UE may transmit PUCCH information on one cell (PCell or PSCell) to a given eNB.

As the number of CA capable UEs and also the number of aggregated carriers increase, the number of PUCCHs and also the PUCCH payload size may increase. Accommodating the PUCCH transmissions on the PCell may lead to a high PUCCH load on the PCell. A PUCCH on an SCell may be introduced to offload the PUCCH resource from the PCell. More than one PUCCH may be configured for example, a PUCCH on a PCell and another PUCCH on an SCell. In the example embodiments, one, two or more cells may be configured with PUCCH resources for transmitting CSI/ACK/NACK to a base station. Cells may be grouped into multiple PUCCH groups, and one or more cell within a group may be configured with a PUCCH. In an example configuration, one SCell may belong to one PUCCH group. SCells with a configured PUCCH transmitted to a base station may be called a PUCCH SCell, and a cell group with a common PUCCH resource transmitted to the same base station may be called a PUCCH group.

In an example embodiment, a MAC entity may have a configurable timer timeAlignmentTimer per TAG. The time-AlignmentTimer may be used to control how long the MAC entity considers the Serving Cells belonging to the associated TAG to be uplink time aligned. The MAC entity may, when a Timing Advance Command MAC control element is received, apply the Timing Advance Command for the indicated TAG; start or restart the timeAlignmentTimer associated with the indicated TAG. The MAC entity may, when a Timing Advance Command is received in a Random Access Response message for a serving cell belonging to a TAG and/or if the Random Access Preamble was not selected by the MAC entity, apply the Timing Advance Command for this TAG and start or restart the timeAlignmentTimer associated with this TAG. Otherwise, if the timeAlignmentTimer associated with this TAG is not running, the Timing Advance Command for this TAG may be applied and the timeAlignmentTimer associated with this TAG started. When the contention resolution is considered not successful, a timeAlignmentTimer associated with this TAG may be stopped. Otherwise, the MAC entity may ignore the received Timing Advance Command.

In example embodiments, a timer is running once it is started, until it is stopped or until it expires; otherwise it may not be running. A timer can be started if it is not running or restarted if it is running. For example, a timer may be started or restarted from its initial value.

Example embodiments of the invention may enable operation of multi-carrier communications. Other example embodiments may comprise a non-transitory tangible computer readable media comprising instructions executable by one or more processors to cause operation of multi-carrier communications. Yet other example embodiments may comprise an article of manufacture that comprises a non-transitory tangible computer readable machine-accessible medium having instructions encoded thereon for enabling programmable hardware to cause a device (e.g. wireless communicator, UE, base station, etc.) to enable operation of multi-carrier communications. The device may include processors, memory, interfaces, and/or the like. Other example embodiments may comprise communication networks comprising devices such as base stations, wireless devices (or user equipment: UE), servers, switches, antennas, and/or the like.

FIG. 11A, FIG. 11B, FIG. 11C, FIG. 11D, FIG. 11E, and FIG. 11F are example diagrams for architectures of tight interworking between 5G RAN and LTE RAN as per an aspect of an embodiment of the present invention. The tight interworking may enable a multiple RX/TX UE in RRC_CONNECTED to be configured to utilize radio resources provided by two schedulers located in two base stations (e.g. (e)LTE eNB and gNB) connected via a non-ideal or ideal backhaul over the Xx interface between LTE eNB and gNB or the Xn interface between eLTE eNB and gNB. Base stations involved in tight interworking for a certain UE may assume two different roles: a base station may either act as a master base station or as a secondary base station. In tight interworking, a UE may be connected to one master base station and one secondary base station. Mechanisms implemented in tight interworking may be extended to cover more than two base stations.

In FIG. 11A and FIG. 11B, a master base station may be an LTE eNB, which may be connected to EPC nodes (e.g. to an MME via the S1-C interface and to an S-GW via the S1-U interface), and a secondary base station may be a gNB, which may be a non-standalone node having a control plane connection via an Xx-C interface to an LTE eNB. In the tight interworking architecture of FIG. 11A, a user plane for a gNB may be connected to an S-GW through an LTE eNB via an Xx-U interface between LTE eNB and gNB and an S1-U interface between LTE eNB and S-GW. In the architecture of FIG. 11B, a user plane for a gNB may be connected directly to an S-GW via an S1-U interface between gNB and S-GW.

In FIG. 11C and FIG. 11D, a master base station may be a gNB, which may be connected to NGC nodes (e.g. to a control plane core node via the NG-C interface and to a user plane core node via the NG-U interface), and a secondary base station may be an eLTE eNB, which may be a non-standalone node having a control plane connection via an Xn-C interface to a gNB. In the tight interworking architecture of FIG. 11C, a user plane for an eLTE eNB may be connected to a user plane core node through a gNB via an Xn-U interface between eLTE eNB and gNB and an NG-U interface between gNB and user plane core node. In the architecture of FIG. 11D, a user plane for an eLTE eNB may be connected directly to a user plane core node via an NG-U interface between eLTE eNB and user plane core node.

In FIG. 11E and FIG. 11F, a master base station may be an eLTE eNB, which may be connected to NGC nodes (e.g. to a control plane core node via the NG-C interface and to a user plane core node via the NG-U interface), and a secondary base station may be a gNB, which may be a non-standalone node having a control plane connection via an Xn-C interface to an eLTE eNB. In the tight interworking architecture of FIG. 11E, a user plane for a gNB may be connected to a user plane core node through an eLTE eNB via an Xn-U interface between eLTE eNB and gNB and an NG-U interface between eLTE eNB and user plane core node. In the architecture of FIG. 11F, a user plane for a gNB may be connected directly to a user plane core node via an NG-U interface between gNB and user plane core node.

FIG. 12A, FIG. 12B, and FIG. 12C are example diagrams for radio protocol structures of tight interworking bearers as per an aspect of an embodiment of the present invention. In FIG. 12A, an LTE eNB may be a master base station, and a gNB may be a secondary base station. In FIG. 12B, a gNB may be a master base station, and an eLTE eNB may be a secondary base station. In FIG. 12C, an eLTE eNB may be a master base station, and a gNB may be a secondary base station. In 5G network, the radio protocol architecture that a particular bearer uses may depend on how the bearer is setup. Three alternatives may exist, an MCG bearer, an SCG bearer, and a split bearer as shown in FIG. 12A, FIG. 12B, and FIG. 12C. NR RRC may be located in master base station, and SRBs may be configured as an MCG bearer type and may use the radio resources of the master base station. Tight interworking may also be described as having at least one bearer configured to use radio resources provided by the secondary base station. Tight interworking may or may not be configured/implemented in example embodiments of the invention.

In the case of tight interworking, the UE may be configured with two MAC entities: one MAC entity for master base station, and one MAC entity for secondary base station. In tight interworking, the configured set of serving cells for a UE may comprise of two subsets: the Master Cell Group (MCG) containing the serving cells of the master base station, and the Secondary Cell Group (SCG) containing the serving cells of the secondary base station. For a SCG, one or more of the following may be applied: at least one cell in the SCG has a configured UL CC and one of them, named PSCell (or PCell of SCG, or sometimes called PCell), is configured with PUCCH resources; when the SCG is configured, there may be at least one SCG bearer or one split bearer; upon detection of a physical layer problem or a random access problem on a PSCell, or the maximum number of (NR) RLC retransmissions has been reached associated with the SCG, or upon detection of an access problem on a PSCell during a SCG addition or a SCG change: a RRC connection re-establishment procedure may not be triggered, UL transmissions towards cells of the SCG are stopped, a master base station may be informed by the UE of a SCG failure type, for split bearer, the DL data transfer over the master base station is maintained; the RLC AM bearer may be configured for the split bearer; like PCell, PSCell may not be de-activated; PSCell may be changed with a SCG change (e.g. with security key change and a RACH procedure); and/or neither a direct bearer type change between a Split bearer and a SCG bearer nor simultaneous configuration of a SCG and a Split bearer are supported.

With respect to the interaction between a master base station and a secondary base station, one or more of the following principles may be applied: the master base station may maintain the RRM measurement configuration of the UE and may, (e.g, based on received measurement reports, traffic conditions, or bearer types), decide to ask a secondary base station to provide additional resources (serving cells) for a UE; upon receiving a request from the master base station, a secondary base station may create a container that may result in the configuration of additional serving cells for the UE (or decide that it has no resource available to do so); for UE capability coordination, the master base station may provide (part of) the AS configuration and the UE capabilities to the secondary base station; the master base station and the secondary base station may exchange information about a UE configuration by employing of RRC containers (inter-node messages) carried in Xn or Xx messages; the secondary base station may initiate a reconfiguration of its existing serving cells (e.g., PUCCH towards the secondary base station); the secondary base station may decide which cell is the PSCell within the SCG; the master base station may not change the content of the RRC configuration provided by the secondary base station; in the case of a SCG addition and a SCG SCell addition, the master base station may provide the latest measurement results for the SCG cell(s); both a master base station and a secondary base station may know the SFN and subframe offset of each other by OAM, (e.g., for the purpose of DRX alignment and identification of a measurement gap). In an example, when adding a new SCG SCell, dedicated RRC signaling may be used for sending required system information of the cell as for CA, except for the SFN acquired from a MIB of the PSCell of a SCG.

FIG. 13A and FIG. 13B are example diagrams for gNB deployment scenarios as per an aspect of an embodiment of the present invention. In the non-centralized deployment scenario in FIG. 13A, the full protocol stack (e.g. NR RRC, NR PDCP, NR RLC, NR MAC, and NR PHY) may be supported at one node. In the centralized deployment scenario in FIG. 13B, upper layers of gNB may be located in a Central Unit (CU), and lower layers of gNB may be located in Distributed Units (DU). The CU-DU interface (e.g. Fs interface) connecting CU and DU may be ideal or non-ideal. Fs-C may provide a control plane connection over Fs interface, and Fs-U may provide a user plane connection over Fs interface. In the centralized deployment, different functional split options between CU and DUs may be possible by locating different protocol layers (RAN functions) in CU and DU. The functional split may support flexibility to move RAN functions between CU and DU depending on service requirements and/or network environments. The functional split option may change during operation after Fs interface setup procedure, or may change only in Fs setup procedure (i.e. static during operation after Fs setup procedure).

Figure 14:
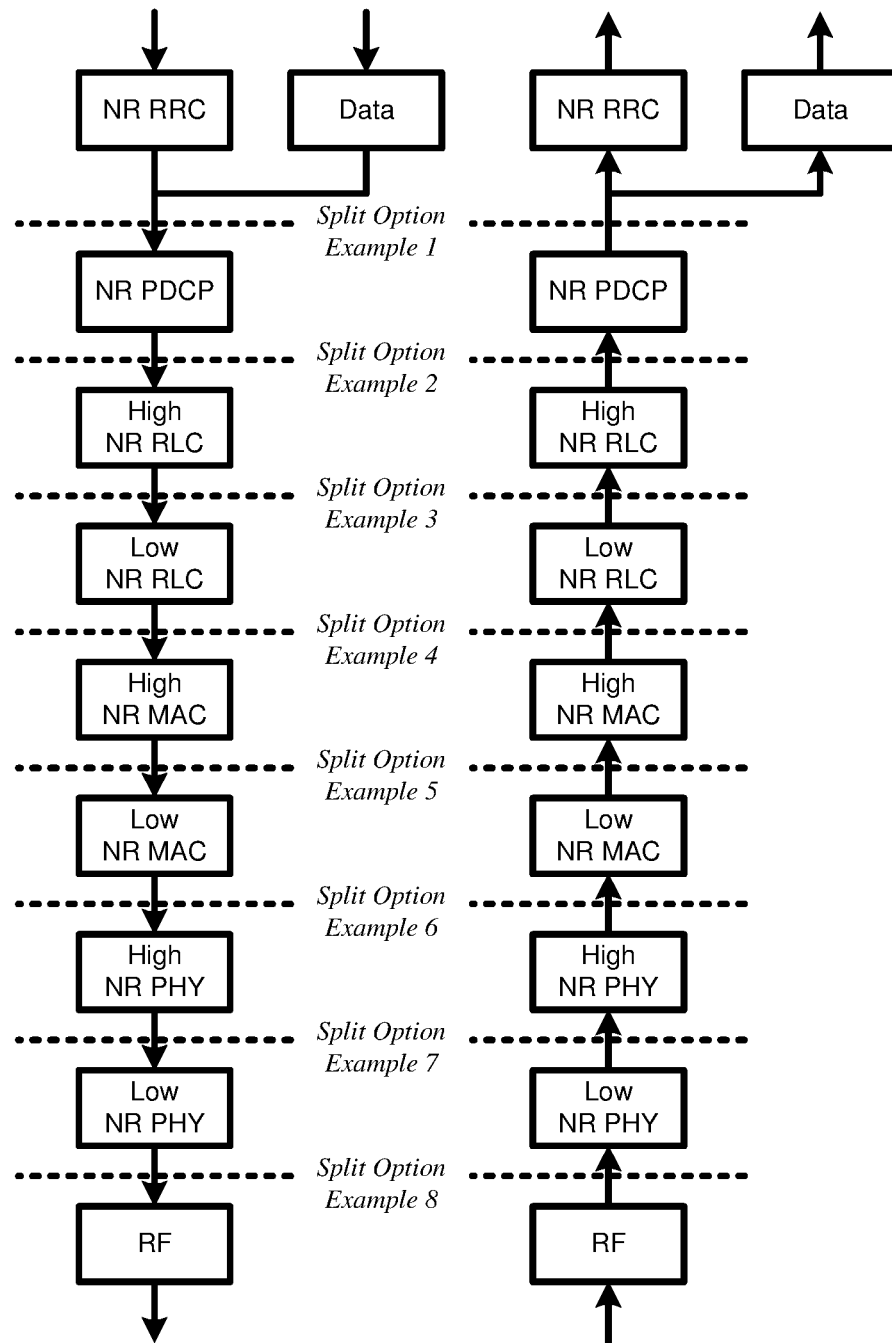
FIG. 14 is an example diagram for functional split option examples of the centralized gNB deployment scenario as per an aspect of an embodiment of the present invention.

FIG. 14 is an example diagram for different functional split option examples of the centralized gNB deployment scenario as per an aspect of an embodiment of the present invention. In the split option example 1, an NR RRC may be in CU, and NR PDCP, NR RLC, NR MAC, NR PHY, and RF may be in DU. In the split option example 2, an NR RRC and NR PDCP may be in CU, and NR RLC, NR MAC, NR PHY, and RF may be in DU. In the split option example 3, an NR RRC, NR PDCP, and partial function of NR RLC may be in CU, and the other partial function of NR RLC, NR MAC, NR PHY, and RF may be in DU. In the split option example 4, an NR RRC, NR PDCP, and NR RLC may be in CU, and NR MAC, NR PHY, and RF may be in DU. In the split option example 5, an NR RRC, NR PDCP, NR RLC, and partial function of NR MAC may be in CU, and the other partial function of NR MAC, NR PHY, and RF may be in DU. In the split option example 6, an NR RRC, NR PDCP, NR RLC, and NR MAC may be in CU, and NR PHY and RF may be in DU. In the split option example 7, an NR RRC, NR PDCP, NR RLC, NR MAC, and partial function of NR PHY may be in CU, and the other partial function of NR PHY and RF may be in DU. In the split option example 8, an NR RRC, NR PDCP, NR RLC, NR MAC, and NR PHY may be in CU, and RF may be in DU.

The functional split may be configured per CU, per DU, per UE, per bearer, per slice, or with other granularities. In per CU split, a CU may have a fixed split, and DUs may be configured to match the split option of CU. In per DU split, each DU may be configured with a different split, and a CU may provide different split options for different DUs. In per UE split, a gNB (CU and DU) may provide different split options for different UEs. In per bearer split, different split options may be utilized for different bearer types. In per slice splice, different split options may be applied for different slices.

In an example embodiment, the new radio access network (new RAN) may support different network slices, which may allow differentiated treatment customized to support different service requirements with end to end scope. The new RAN may provide a differentiated handling of traffic for different network slices that may be pre-configured, and may allow a single RAN node to support multiple slices. The new RAN may support selection of a RAN part for a given network slice, by one or more slice ID(s) or NSSAI(s) provided by a UE or a NGC (e.g. NG CP). The slice ID(s) or NSSAI(s) may identify one or more of pre-configured network slices in a PLMN. For initial attach, a UE may provide a slice ID and/or an NSSAI, and a RAN node (e.g. gNB) may use the slice ID or the NSSAI for routing an initial NAS signaling to an NGC control plane function (e.g. NG CP). If a UE does not provide any slice ID or NSSAI, a RAN node may send a NAS signaling to a default NGC control plane function. For subsequent accesses, the UE may provide a temporary ID for a slice identification, which may be assigned by the NGC control plane function, to enable a RAN node to route the NAS message to a relevant NGC control plane function. The new RAN may support resource isolation between slices. The RAN resource isolation may be achieved by avoiding that shortage of shared resources in one slice breaks a service level agreement for another slice.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

In an example, a base station may configure a wireless device with uplink transmission without grant. The resources for uplink transmission scheme without grant may be semi-statically (re-)configured. In an example, the resource configuration may at least include physical resources in time and frequency domain and RS parameters. The configuration parameters may include at least modulation and coding scheme (MCS) and/or redundancy version and/or a number of repetitions (K). In an example, a wireless device may be configured with multiple K values. For an uplink transmission without grant, RS may be transmitted with data. In an example, the same channel structure as grant-based transmission may be employed for uplink transmission without grant. In an example, at least for CP-OFDM, a common DMRS structure may be used for downlink and uplink. In an example, for am uplink transmission with and/or without grant, K repetitions, including initial transmission, with/without same RV and with/without same MCS for the same transport block may be used. In an example, frequency hopping may be used between initial transmission and a retransmission and/or between retransmissions. In an example, for uplink transmission without grant, a UE may continue repetitions for a TB until either an ACK is successfully received from a base station or the number of repetitions for the TB reaches K. In an example, for a UE configured with K repetitions for a TB transmission with/without grant, the UE may continue repetition for the TB until an uplink grant is successfully received for a slot/mini-slot for the same TB and/or an acknowledgement/ indication of successful receiving of that TB from base station and/or the number of repetitions for that TB reaches K. In an example, a UE may be identified based on or a UE ID may be based on RS sequence/configuration for the UE and/or radio resources configured for uplink transmission.

In an example, time and frequency resource for uplink transmission without grant may be configured in a UE-specific manner. The network may configure the same time/frequency resource and/or RS parameters to multiple UEs. The base station may avoid collision with network implementation. The base station may identify a UE ID based on physical layer parameters such as time/frequency resources and/or RS (e.g., DMRS) resources/parameters. In an example, both DFT-S-OFDM and CP-OFDM may be supported for uplink transmission without grant. In an example, uplink transmission without grant may support one or more HARQ processes. HARQ process ID may be identified based on resources used for uplink transmission without grant, e.g., time/frequency resources and/or RS parameters for HARQ process ID identification for both transmission with and without grant.

In an example, a wireless device may be configured with a plurality of parameters for uplink data transmission without grant. In an example, a wireless device may be configured with reference symbol, time and frequency resources in a UE-specific manner. The time and frequency resources configured for a UE may or may not collide with those of another UE. In an example, DFT-S-OFDM and CP-OFDM may be supported for uplink transmission without grant. In an example, uplink transmission without grant may support a plurality of HARQ processes. In an example, L1 signaling may be used for activation/deactivation of uplink transmission without grant. In an example, L1 signaling may be used for modification of parameters configured by RRC. Example parameters may comprise time domain resource allocation (e.g., for one transmission), frequency domain resource allocation (e.g., in terms of RBs or RBGs), UE-specific DMRS configuration, MCS/TBS, etc. In an example, L1 signaling may be used for switching to grant-based retransmission for the same TB. In an example, the L1 signaling may be based on UE-specific DCI (e.g., uplink grant) or a group common DCI. In an example, RRC (re-)configuration of a set of resource and parameters may include transmission interval, physical resource such as time domain resource allocation (e.g., for one transmission), frequency domain resource allocation, e.g., in terms of RBs or RBG(s), UE-specific DMRS configuration, etc. In an example, a plurality of physical resources may be configured in the transmission interval. In an example, one or more repetitions of a same one or more TBs may be performed (e.g., during the transmission interval) after an initial transmission. In an example, a repetition in the one or more repetitions may be performed in the same resource used for initial transmission. In an example, a repetition in the one or more repetitions may be may be in a different resource than the initial transmission.

In an example, uplink transmission without grant, may be configured/activated with a plurality of types. In an example first type, UL data transmission without grant may be based on RRC (re-)configuration without L1 signaling. In an example second type, UL data transmission without grant may be based on both RRC configuration and L1 signaling for activation/deactivation. In an example third type, UL data transmission without grant may be based on RRC configuration and may allow L1 signaling to modify some parameters configured by RRC but no L1 signaling for activation. In an example, for first type UL data transmission without grant, the RRC (re-) configuration may comprise periodicity and offset of a resource with respect to SFN=0, time domain resource allocation, frequency domain resource allocation, UE-specific DMRS configuration, MCS/TBS, number of repetitions K, power control related parameters, HARQ related parameters, etc. In an example, for second type UL transmission without grant, at least periodicity and power control related parameters may be RRC configured. In an example, for second type UL transmission without grant, at least an offset value with respect to a timing reference, time domain resource allocation, frequency domain resource allocation, UE-specific DMRS configuration, MCS/TBS may be indicated by L1 signaling. The number of repetitions K may be RRC configured and/or indicated by L1 signaling.

In an example, an uplink grant in response to an uplink transmission without grant may indicate an ACK for the uplink transmission without grant. The uplink grant may be a dynamic grant, e.g., for the same HARQ process as the uplink transmission without grant.

In an example, a group-common DCI may be used to indicate HARQ feedback for uplink transmission without grant. In an example, the group common DCI may indicate ACK. In an example, the group common DCI may indicate ACK and NACK.

In an example, the wireless device may use a timer to determine implicit ACK/NACK corresponding to an uplink transmission without grant. In an example, the timer value may be configured for the wireless device. The wireless device may receive one or more RRC message indicating the timer value. In an example, the wireless device may (re-) start the timer in response to an uplink transmission without grant (e.g., one or more TBs corresponding to an uplink transmission without grant). In an example, the wireless device may assume an ACK in response to the timer expiring and not receiving a NACK after K repetitions. In an example, the wireless device may assume a NACK in response to the timer expiring and not receiving an ACK. In an example, the wireless device may assume a NACK corresponding to an uplink transmission without grant in response to receiving a grant (e.g., dynamic grant) for retransmission of the same one or more TBs in a first uplink transmission without grant (e.g., the same HARQ process and with NDI not toggled). In an example, the wireless device may assume a NACK corresponding to an uplink transmission without grant in response to receiving a grant (e.g., dynamic grant) for retransmission of the same one or more TB in a first uplink transmission without grant in a period of time. In an example, the period of time may be configured for the wireless device. The wireless device may receive an RRC message indicating the period of time. In an example, the period of time may be pre-configured.

In an example embodiment, a base station may configure a wireless device with a first RNTI. The first RNTI may be a group-common RNTI. In an example, for indicating HARQ feedback (e.g., ACK/NACK) corresponding to one or more uplink transmissions (e.g., one or more TBs corresponding to one or more uplink transmission) without uplink grant (e.g., for semi-persistent scheduling (SPS) and/or grant-free resource configuration) for one or more wireless device, the base station may transmit a downlink control information (DCI) (e.g., a group common DCI) corresponding to the first RNTI. In an example, a wireless device may monitor a common search space to detect the DCI corresponding to the first RNTI. In an example, the base station may transmit/indicate NACK (e.g., using the DCI) corresponding to one or more TBs of the wireless device and the wireless device may assume an ACK (e.g., implicit ACK) if no NACK is received within a period of time. In an example, the base station may transmit/indicate an ACK (e.g., using the DCI) and the wireless device may assume a NACK (e.g., implicit NACK) if no ACK is received within a period of time. The period for time may be configured for the wireless device. In an example, the base station may transmit an RRC message indicating the period of time. In an example, the period of time may be pre-configured. In an example, the wireless device may transmit up to a first number of repetitions of a same one or more TBs corresponding to an uplink transmission without grant. The period of time may be or may be based on the duration that the first number of repetitions of the same one or more TBs corresponding to the uplink transmission is received. The wireless device may monitor for the DCI at least for a portion of the period of time. The wireless device may stop monitoring the DCI in response to receiving the ACK/NACK corresponding to the uplink transmission without grant. In an example, the DCI may comprise ACK/NACK for a plurality of UEs. The plurality of UEs may be configured with the same first RNTI used for transmission of the DCI. In an example, the plurality of UEs configured with the same first RNTI may monitor the search space and may detect the same DCI and may identify HARQ feedback corresponding to their transmissions. In an example, the DCI may comprise a plurality of HARQ feedbacks (e.g., corresponding to a plurality of TBs) for the same wireless device. The mapping between a HARQ feedback and a corresponding UE and/or a TB in a plurality of TBs transmitted by a UE may be based on a rule and/or implicitly/explicitly indicated by the DCI.

Uplink demodulation reference signals (DMRS) may be used for channel estimation and/or coherent demodulation of PUSCH and PUCCH. In an example, a base station may configure a wireless device with DMRS configuration parameters. The wireless device may receive one or more RRC messages. The one or more RRC messages may comprise a DMRS-Config IE. The DMRS-Config IE may comprise DMRS configuration parameters. An example, DMRS-Config IE may be as follows. Example embodiments may enhance the DMRS-Config configuration and/or the DMRS-Config configuration parameters.

```
DMRS-Config-r11 ::=        CHOICE {
    release                NULL,
    setup                  SEQUENCE {
        scramblingIdentity-r11      INTEGER (0..503),
        scramblingIdentity2-r11     INTEGER (0..503)
    }
}
DMRS-Config-v1310 ::=      SEQUENCE {
    dmrs-tableAlt-r13          ENUMERATED {true}    OPTIONAL
    -- Need OR
}
```

In an example, parameters scramblingIdentity and/or scramblingIdentity2 may indicate a parameter $n^{DMRS,i}_{ID}$. In an example, the parameter, dmrs-tableAlt may indicate whether to use an alternative table for DMRS upon PDSCH transmission.

In an example, a grant-free (GF) resource pool configuration may not be known to UEs. It may be coordinated between different cells for interference coordination. If the GF resource pools are known to UEs, those may be semi-statically configured by UE-specific RRC signaling or non-UE-specific RRC signaling (e.g., via broadcasting a system information block in LTE). The RRC signaling for GF radio resource configuration may include one or more parameters indicating at least one of following: periodicity and offset of a resource with respect to SFN=0, time domain resource allocation, frequency domain resource allocation, UE-specific DMRS configuration, a modulation and coding scheme (MCS), a transport block size (TBS), number of repetitions K, a hopping pattern, HARQ related parameters, or power control related parameters. A UE may activate the GF UL transmission configured by the RRC signaling in response to receiving the RRC signaling without an additional signaling.

In an example, an L1 activation signaling may be employed with RRC signaling to configure/activate a GF configuration. In an example, RRC signaling may configure one or more parameters of GF UL transmission to the UE, and L1 activation signaling may activate, or deactivate the configured GF UL transmission. L1 activation signaling may be used to configure, adjust, modify, or update one or more parameters associated with GF UL transmission.

The L1 activation signaling may be transmitted via a PDCCH in the form of DCI, e.g., DCI employed for LTE UL semi-persistent scheduling (SPS). gNB may assign a radio network temporary identifier (RNTI) for a UE along with GF configuration parameters in the RRC signaling. With the assigned RNTI, UE may monitor the PDCCH to receive the L1 activation signaling masked by the RNTI.

In an example, the RRC (re-)configuration of GF UL transmission without UL grant may comprise at least one of following: Periodicity of a resource or Power control related parameters. The L1 activation signaling may provide at least one of the following parameters for the GF resource: Offset associated with the periodicity with respect to a timing reference, time domain resource allocation, frequency domain resource allocation, UE-specific DMRS configuration, an MCS/TBS value, HARQ related parameters, number of repetitions K, or a hopping pattern.

In an example, the MCS may be indicated by the UE within the grant-free data. In an example, in order to avoid the blind decoding of MCS indication, the limited number of MCS levels may be pre-configured by a gNB, e.g., K bits may be used to indicate MCS of grant-free data, where K may be as small as possible. The number of REs used to transmit MCS indication in a resource group may be semi-statically configured. In the GF operation, there may be one common MCS predefined for all UEs. In this case, there may be a tradeoff between a spectrum efficiency and decoding reliability, e.g., the spectrum efficiency may be reduced if a low level of MCS is used, while the data transmission reliability gets higher. The NR may predefine a mapping rule between multiple time/frequency resources for UL grant-free transmission and MCSs. In an example, a UE may select an appropriate MCS according to a DL measurement and associated time/frequency resources to transmit UL data. In this way, UE may choose a MCS based on the channel status and increase the resource utilization.

In an example, when a UE configured with a GF UL transmission, the GF UL transmission may be activated in different ways, via RRC signaling or via L1 activation signaling. The need for L1 activation signaling may depend on service types, and the dynamic activation (e.g., activation via L1 activation signaling) may not be supported in the NR or may be configurable based on service and traffic considerations.

In example, it may be up to a gNB whether to configure a UE with or without L1 activation signaling, which may be determined based on, for example, traffic pattern, latency requirements, and other possible aspects. With the L1 activation signaling, a UE may transmit a data packet with the configured time frequency radio resource when the UE receives an L1 activation signaling from the gNB. If the L1 activation signaling is not configured, a UE may start a UL transmission with the configured GF radio resource at any moment or in a certain time interval (which may be configured by RRC signaling or pre-defined) once the configuration is completed. For example, a UE may activate the GF UL transmission in response to receiving the RRC signaling configuring the GF UL transmission.

In an example, the activation type (via RRC signaling or via L1 activation signaling) may be pre-configured in NR.

In an example, RRC signaling, transmitted from a gNB to a UE to configure a UL GF transmission, may comprise an indicator employed for indicating whether the activation of the UL GF transmission needs an L1 activation signaling. If the indicator indicates a need of L1 activation signaling, the UE may wait an L1 activation signaling and activate the configured UL GF transmission in response to receiving the L1 activation signaling. When the L1 activation signaling is employed, the UE may transmit an acknowledgement in response to receiving an L1 activation signaling to the gNB to inform of whether the UE correctly receives it.

In an example, if the indicator indicates no need of L1 activation signaling, the UL GF transmission may be activated in response to the RRC signaling configuring the GF UL transmission. For the case of the activation of GF UL transmission without the L1 activation signaling, the UE may not determine when to start the GF UL transmission. The gNB and UE may predefine the start timing based on a time offset and the transmission time interval (TTI), e.g., a subframe, slot, or mini-slot, where the UE receive the RRC signaling for the GF UL transmission configuration, or the RRC configuration may comprise one or more parameters indicating the start timing (in terms of a subframe, slot, or mini-slot).

In an example, RRC signaling may not contain an indicator whether the activation needs a L1 activation signaling. A UE may implicitly know whether the configured GF transmission is activated by RRC signaling or L1 activation signaling based on a format of RRC configuration. For a GF UL transmission without L1 activation signaling, the RRC signaling for configuring and activating the GF UL transmission may comprise one or more parameters for the UL GF transmission. For a GF UL transmission activated by the L1 activation signaling, a RRC signaling may comprise a different number of parameters that may be less than a number of parameters in the RRC signaling activating the GF UL transmission. In this case, the absence of one or more parameters and/or the number of parameters in the RRC signaling may be an implicit indicator for a UE whether to activate the GF UL transmission via RRC signaling or via L1 activation signaling.

In an example, the L1 activation signaling may comprise one or more parameters indicating at least one of GF configuration, e.g., start timing of GF UL transmission, GF time and frequency radio resources, DMRS parameters, a modulation and coding scheme (MCS), a transport block size (TBS), number of repetitions K, a hopping pattern, or power control parameters. For example, a downlink control information (DCI) format used for the activation of the GF UL transmission may comprise one or more fields indicating a MCS for the GF UL transmission. In this case, the GF UL transmission requiring the L1 activation signaling may be configured with a RRC signaling that may not comprise one or more parameters indicating the MCS for the GF UL transmission. The MCS information may be carried by a L1 signaling which activate the GF UL transmission. If a UE receives a RRC signaling comprising a MCS for a GF UL transmission, the UE may activate the GF UL transmission in response to the RRC signaling without waiting for a L1 signaling.

In an example, if the service does not require high reliability and latency, the L1 activation signaling may be configured to control network resource load and utilization. For a delay sensitive service, the additional activation signaling may cause additional delay and may lead to potential service interruption or unavailability for the period of applying and requesting the activation. In this case, a gNB may configure the UE with a GF UL transmission such that the GF UL transmission is activated in response to the RRC signaling comprising a GF radio resource configuration and transmission parameters.

In an example, there may be a case that the GF radio resource is over-allocated which may result in the waste of radio resources with few UEs. In this case, L1 signalling may be used to reconfigure the GF UL radio resource or one or more GF transmission parameters. By allowing L1 signaling-based reconfiguration, UEs may periodically monitor downlink control channel to detect the L1 signaling scrambled by a RNTI that may indicate whether the configured GF radio resources or parameters are changed. This may increase the power consumption of UE, and the periodicity to check the downlink control signaling may need to be configurable. In an example, if a radio resource utilization is important, the periodicity may be configured to be short like every 1 minute or every radio frame. If the power consumption is important, the periodicity may be configured to be long like every 1 hour. The periodicity to check downlink control signaling may need to be allowed to be separated from the periodicity of GF UL transmission, e.g., in order to shorten the latency. In an example, the periodicity of GF radio resource may be less than 1 ms like 0.125 ms but the periodicity to check downlink control signaling may be 1 minute or 1 hour.

In an example, for deactivating the activated GF operation, L1 deactivation signaling may be used for all services in order to release resources as fast as possible.

For the GF UL transmission, a gNB may support a K-repetition of the same transport block (TB) transmission over the GF radio resource pool until one or more conditions are met. The UE may continue the repetitions upto K times for the same TB until one of the following conditions is met: If an UL grant (or HARQ ACK/NACK) is successfully received from the gNB before the number of repetitions reaches K, the number of repetitions for the TB reaches K, or other termination condition of repetition may apply.

In an example, the number of repetitions, K, may be a configurable parameter that may be UE-specific, and/or cell-specific. A mini-slot or a symbol may be a unit of the K-repetition. A gNB may configure the number of this repetition and the radio resource in advance via one or more RRC messages. The gNB may transmit L1 activation signaling comprising a parameter indicating the number of repetitions K. The gNB may assume a set of initial transmission and the repetition as one amount of the transmission. The gNB may not be required to prepare the case of only initial transmission or only repetition. One may call the set of initial transmission and its one or more repetitions as an extended TTI. The repetitions may not be necessarily contiguous in time. If the repetitions are contiguous in time, it may allow coherent combining. If the repetitions are not contiguous in time, it may allow time diversity.

In an example, when the GF UL transmission of two UEs collides in the same GF radio resource pool, a gNB may fail to detect both UEs' data. When the two UEs retransmit the data without UL grants, the two UEs may collide again. In such a case, hopping may to solve the collision problem when radio resources are shared by multiple UEs. The hopping may randomize the collision relationship between UEs within a certain time interval to avoid persistent collision. It may bring a diversity gain on the frequency domain. A UE-specific hopping pattern may be pre-configured or be indicated by RRC signaling or L1 activation signaling. The UE-specific hopping pattern may be generated based on a known UE-specific ID, e.g., UE-specific DMRS index and/or RNTI.

There may be many factors considered for the hopping pattern design, such as the number of resource units (RUs), the max number of UEs sharing the same RU, the recently used RU index, the recent hopping index or the current slot index, the information indicating recently used sequence, hopping pattern, or hopping rule. The sequence described above may be a DMRS, a spreading sequence, or a preamble sequence that may be UE-specific.

In an example, the repetitions parameter K may be configured by one or more RRC messages or L1 activation signaling. A UE configured with the repetitions parameter K may transmit a transport block (TB) K times. The UE may transmit the TB K times with the same redundancy version (RV) or transmit the TB K times with different RVs between the repetition. For example, the RV determination for K repetitions may comprise the initial transmission.

In an example, for the case that the GF UL transmission is activated by one or more RRC messages, the RV determination may be fixed to a single value or fixed to a pre-defined RV pattern comprising a plurality of RVs. For the case that the GF UL transmission is activated by one or more RRC messages, the RV determination may be configured by the one or more RRC messages with a single value or a RV pattern comprising a plurality of RVs.

In an example, for the case that the GF UL transmission is (fully or partially) configured by one or more RRC messages and activated by an L1 activation signaling, the RV determination may be fixed to a single value or fixed to a pre-defined RV pattern comprising a plurality of RVs. For the case that the GF UL transmission is (fully or partially) configured by one or more RRC messages and activated by L1 activation signaling, the RV determination may be configured by the one or more RRC messages with a single value or a RV pattern comprising a plurality of RVs. For the case that the GF UL transmission is (fully or partially) configured by one or more RRC messages and activated by L1 activation signaling, the RV determination may be configured by the L1 activation signaling with a single value or fixed to a RV pattern comprising a plurality of RVs.

In example embodiments, the gNB may support to switch between GF and GB UL transmissions to balance resource utilization and delay/reliability requirements of associated services. The GF UL transmission may be based on a semi-static resource configuration that may be beneficial to reduce latency. Such a pre-defined resource configuration may be hard to satisfy all potential services or packet sizes. The overhead may be large, and the packet size for a service, such as URLLC, may be variable. If a UE's data packet collides with other UE's packets in the GF UL transmission, a re-attempt to access GF radio resources may not achieve the service requirements. In such cases, switching from GF to GB UL transmissions may be beneficial.

In example embodiments, to support the switching between GF and GB UL transmissions, the initial transmission on the pre-configured GF radio resources may include UE identification (ID), for example, explicit UE ID information (e.g. C-RNTI) or implicit UE information such as a DMRS cyclic shift (assuming use of ZC sequences) specific signature. To inform a gNB of whether the UE has remaining data to transmit, the UE may include buffer status reporting (BSR) with the initial data transmission. If a gNB successfully decodes data transmitted by a UE and determines that the UE has remaining data to transmit (e.g. from a BSR report), the gNB may switch a type of scheduling for UE from GF to GB UL transmissions. If a gNB fails to decode data transmitted by the UE but successfully detects the UE ID from the uniquely assigned sequence (e.g., preamble and/or DMRS), the gNB may switch a type of scheduling for UE from GF to GB UL transmissions. The UL grant for subsequent data transmissions may be with CRC scrambled by the UE's RNTI (may be determined either by explicit signaling in the initial transmission or implicitly by the DMRS cyclic shift).

In example embodiments, one of the termination conditions for the K-repetitions may be a reception of a DCI comprising a UL grant which schedules a UL (re)transmission for the same TB. A gNB may assign dedicated resources for retransmission in order to ensure the TB to be delivered within the latency budget. This behavior may be classified as scheduling switching from GF to GB operation. In this case, a UE may need to link the received grant with the transmitted TB in order to understand which TB to be retransmitted in case there are multiple ongoing transmission processes at the UE. For these purposes, the UE and gNB may have the same notion of TB (and/or RV) counting.

In example embodiments, for the GF operation, the TB counting may not be possible if a gNB may not detect one or more TBs due to collisions. In order to make an association between a DCI with a TB, there may be one or more options. If there is no other transmission process at the UE side, it may directly associate the DCI with a TB which is being transmitted. If there are at least two different TBs, a UE may deduct that the DCI is for a particular TB by applying an implicit linkage assuming only one TB is transmitted in one transmission interval. In this case, if the interval between detected UE transmission and a grant is fixed, it may unambiguously determine which TB may be retransmitted. If the timing between a detected transmission and a retransmission grant is not preconfigured, an explicit indication of the retransmitted TB may be carried by DCI. If a UE detects that a grant for one TB overlaps with transmission of another ongoing TB, the UE may assume precedence of the grant comparing to the grant-free retransmissions. If a grant is received for a new TB (e.g. for aperiodic CSI reporting) and overlaps with the GF UL transmissions, the GF transmissions may be dropped in the resources. Alternatively, a prioritization rule whether to transmit a triggered report or GF data may be introduced depending on priority of the associated services. For example, if URLLC services is assumed, then the CSI reporting may be dropped in this example.

An example embodiment may employ a dedicated pre-assigned channel for early termination. For example, the physical HARQ indicator channel (PHICH) defined in LTE may be employed as an acknowledge indicator. In LTE, the PHICH for a UE may be determined based on the physical resource block (PRB) and cyclic shift of the DMRS corresponding to the UE's PUSCH transmission. Similar design principle may be employed for a GF UL transmission. The early termination based on PHICH-like channel may improve the control channel capacity and system capacity. If a gNB has successfully received a TB, the gNB may obtain the corresponding information about the transmission of the TB, such as the UE ID, the resource employed for carrying this transmission, the DMRS employed for this transmission. The physical resources may be shared among multiple UEs who may have their own unique identifiers (e.g., DMRS) used in the GF radio resource pool. Therefore, even for GF UL transmission, if the gNB has successfully received a TB, a unique PHICH may be determined.

In example embodiments, using a sequence based signal may be used for early termination of K-repetition. In this case, a sequence based signal may be transmitted via one or more pre-assigned channels to inform the UE to terminate the repetition of transmission. In this case, the signal may be transmitted when a gNB successfully decodes a TB. The UE may perform a simple signal detection for the presence or absence to decide whether to continue the repetitions or not.

In example embodiments, a gNB may switch from GF to GB UL transmissions in order to improve a GF radio resource shortage. In an example, one or more UEs whose delay requirements are not strict (e.g., comparing with URLLC requirements) may employ the GF radio resource to transmit a data packet. A gNB may measure a level of congestion of the GF UL radio resource shared by a plurality of UEs based on statistics, e.g., resource utilization, load, and/or a number of UE sharing the GF UL radio resource and set up a threshold policy to dynamically balance load or resource utilization of the GF UL radio resource. If the resource usage statistic of the GF UL radio resource exceeds the predefined threshold, it may be beneficial to switch some UEs from the GF UL radio resource to the GB UL radio resource, which may result in decreasing the resource collision.

In an example, a wireless device may receive one or more messages comprising one or more radio resource configuration (RRC) messages from one or more base stations (e.g., one or more NR gNBs and/or one or more LTE eNBs and/or one or more eLTE eNBs, etc.). In an example, the one or more messages may comprise configuration parameters for a plurality of logical channels. In an example, the one or more messages may comprise a logical channel identifier for each of the plurality of logical channels. In an example, the logical channel identifier may be one of a plurality of logical channel identifiers. In an example, the plurality of logical channel identifiers may be pre-configured. In an example, the logical channel identifier may be one of a plurality of consecutive integers.

In an example, the plurality of logical channels configured for a wireless device may correspond to one or more bearers. In an example, there may be one-to-one mapping/correspondence between a bearer and a logical channel. In an example, there may be one-to-many mapping/correspondence between one or more bearers and one or more logical channels. In an example, a bearer may be mapped to a plurality of logical channels. In an example, data from a packet data convergence protocol (PDCP) entity corresponding to a bearer may be duplicated and mapped to a plurality of radio link control (RLC) entities and/or logical channels. In an example, scheduling of the plurality of logical channels may be performed by a single medium access control (MAC) entity. In an example, scheduling of the plurality of logical channels may be performed by a two or more MAC entities. In an example, a logical channel may be scheduled by one of a plurality of MAC entities. In an example, the one or more beares may comprise one or more data radio bearers. In an example, the one or more bearers may comprise one or more signaling radio bearers. In an example, the one or more bearers may correspond to one or more application and/or quality of service (QoS) requirements. In an example, one or more bearers may correspond to ultra reliable low latency communications (URLLC) applications and/or enhanced mobile broadband (eMBB) applications and/or massive machine to machine communications (mMTC) applications.

In an example, a first logical channel of the plurality of logical channels may be mapped to one or more of a plurality of transmission time intervals (TTIs)/numerologies. In an example, a logical channel may not be mapped to one or more of the plurality of TTIs/numerologies. In an example, a logical channel corresponding to a URLLC bearer may be mapped to one or more first TTIs and a logical corresponding to an eMBB application may be mapped to one or more second TTIs, wherein the one or more first TTIs may have shorter duration than the one or more second TTIs. In an example, the plurality of TTIs/numerologies may be pre-configured at the wireless device. In an example, the one or more messages may comprise the configuration parameters of the plurality of TTIs/numerologies. In an example, a base station may transmit a grant/DCI to a wireless device, wherein the grant/DCI may comprise indication of a cell and/or a TTI/numerology that the wireless device may transmit data. In an example, a first field in the grant/DCI may indicate the cell and a second field in the grant/DCI may indicate the TTI/numerology. In an example, a field in the grant/DCI may indicate both the cell and the TTI/numerology.

In an example, the one or more messages may comprise a logical channel group identifier for one or more of the plurality of the logical channels. In an example, one or more of the plurality of logical channels may be assigned a logical channel group identifier n, 0≤n≤N (e.g., N=3, or 5, or 7, or 11 or 15, etc.). In an example, the one or more of the plurality of logical channels with the logical channel group identifier may be mapped to a same one or more TTIs/numerologies. In an example, the one or more of the plurality of logical channels with the logical channel group identifier may only be mapped to a same one or more TTIs/numerologies. In an example, the one more of the plurality of logical channels may correspond to a same application and/or QoS requirements. In an example, a first one or more logical channels may be assigned logical channel identifier(s) and logical channel group identifier(s) and a second one or more logical channels may be assigned logical channel identifier(s). In an example, a logical channel group may comprise of one logical channel.

In an example, the one or more messages may comprise one or more first fields indicating mapping between the plurality of logical channels and the plurality of TTIs/numerologies and/or cells. In an example, the one or more first fields may comprise a first value indicating a logical channel is mapped to one or more first TTI duration shorter than or equal to the first value. In an example, the one or more first fields may comprise a second value indicating a logical channel is mapped to one or more second TTI durations longer than or equal to the second value. In an example, the one or more first fields may comprise and/or indicate one or more TTIs/numerologies and/or cells that a logical channel is mapped to. In an example, the mapping may be indicated using one or more bitmaps. In an example, if a value of 1 in a bitmap associated with a logical channel may indicate that the logical channel is mapped to a corresponding TTI/numerology and/or cell. In an example, if a value of 0 in the bitmap associated with a logical channel may indicate that the logical channel is not mapped to a corresponding TTI/numerology and/or cell. In an example, the one or more messages may comprise configuration parameters for the plurality of the logical channels. In an example, the configuration parameters for a logical channel may comprise an associated bitmap for the logical channel wherein the bitmap may indicate the mapping between the logical channel and the plurality of TTIs/numerology and/or cells.

In an example, a first logical channel may be assigned at least a first logical channel priority. In an example, the first logical channel may be assigned one or more logical channel priorities for one or more TTIs/numerologies. In an example, the first logical channel may be assigned a logical channel priority for each of the plurality of TTIs/numerologies. In an example, a logical channel may be assigned a logical channel priority for each of one or more of the plurality of TTIs/numerologies. In an example, a logical channel may be assigned a logical channel priority for each of one or more TTIs/numerologies wherein the logical channel is mapped to the each of the one or more TTIs/numerologies. In an example, the one or more messages may comprise one or more second fields indicating priorities of a logical channel on one or more TTIs/numerologies. In an example, the one or more second fields may comprise one or more sequences indicating priorities of a logical channel on one or more TTIs/numerologies. In an example, the one or more second fields may comprise a plurality of sequences for the plurality of logical channels. A sequence corresponding to a logical channel may indicate the priorities of the logical channel on the plurality of TTIs/numerologies/cells or one or more of the plurality of TTIs/numerologies/cells. In an example, the priorities may indicate mapping between a logical channel and one or more TTIs/numerologies. In an example, a priority of a logical channel with a given value (e.g., zero or minus infinity or a negative value) for a TTI/numerology may indicate that the logical channel is not mapped to the TTI/numerology. In an example, sizes of the sequence may be variable. In an example, a size of a sequence associated with a logical channel may be a number of TTIs/numerologies to which the logical channel is mapped. In an example, the sizes of the sequence may be fixed, e.g., the number of TTIs/numerologies/cells.

In an example, a TTI/numerology for a grant (e.g., as indicated by the grant/DCI) may not accept data from one or more logical channels. In an example, the one or more logical channels may not be mapped to the TTI/numerology indicated in the grant. In an example, a logical channel of the one or more logical channels may be configured to be mapped to one or more TTIs/numerologies and the TTI/numerology for the grant may not be among the one or more TTIs/numerologies. In an example, a logical channel of the one or more logical channels may be configured with a max-TTI parameter indicating that the logical channel may not be mapped to a TTI longer than max-TTI, and the grant may be for a TTI longer than max-TTI. In an example, a logical channel may be configured with a min-TTI parameter indicating that the logical channel may not be mapped to a TTI shorter than min-TTI, and the grant may be for a TTI shorter than min-TTI. In an example, a logical channel may not be allowed to be transmitted on a cell and/or one or more numerologies and/or one or more numerologies of a cell. In an example, a logical channel may contain duplicate data and the logical channel may be restricted so that the logical channel is not mapped to a cell/numerology. In an example, the logical channel may not be configured with an upper layer configuration parameter 1aa-allowed and the cell may be an LAA cell.

In an example, a MAC entity and/or a multiplexing and assembly entity of a MAC entity may perform a logical channel prioritization (LCP) procedure to allocate resources of one or more grants, indicated to a wireless device by a base station using one or more DCIs, to one or more logical channel. In an example, the timing between a grant/DCI reception time at the wireless device and transmission time may be dynamically indicated to the wireless device (e.g., at least using a parameter in the grant/DCI). In an example, timing between a grant/DCI reception time at the wireless device and transmission time may be fixed/preconfigured and/or semi-statically configured. In an example, the LCP procedure for NR may consider the mapping of a logical channel to one or more numerologies/TTIs, priorities of a logical channel on the one or more numerologies/TTIs, the numerology/TTI indicated in a grant, etc. The LCP procedure may multiplex data from one or more logical channels to form a MAC PDU. The amount of data from a logical channel included in a MAC PDU may depend on the QoS parameters of a bearer and/or service associated with the logical channel, priority of the logical channel on the numerology/TTI indicated in the grant, etc. In an example, one or more grants may be processed jointly at a wireless device (e.g., resources of the one or more grants are allocated substantially at a same time). In an example, one or more first grants of the one or more grants may be grouped into a grouped grant with capacity equal to sum of the capacities of the one or more first grants and the resources of the grouped grant may be allocated to one or more logical channels.

In an example, the MAC layer may provide data transfer services on logical channel. In an example, different logical channel types may be defined/configured for different kinds of data transfer services. In an example, a logical channel type may be defined by what type of information is transferred. In an example, the wireless device may perform a logical channel prioritization procedure (LCP) when a new transmission is performed. The LCP may determine the logical channels multiplexed in a transport block. A logical channel may be associated with buffers at the RLC layer and/or PDCP layer, etc.

In an example, an IE (e.g., LogicalChannelConfig) may be used to configure the logical channel parameters. An example, LogicalChannelConfig IE may be as follows:

```
LogicalChannelConfig ::=      SEQUENCE {
  ul-SpecificParameters       SEQUENCE {
    priority                  INTEGER (1..16),
    prioritisedBitRate        ENUMERATED {kBps0, kBps8,
kBps16, kBps32, kBps64, kBps128,kBps256, infinity, kBps512-
v1020, kBps1024-v1020,kBps2048-v1020, spare5, spare4, spare3,
spare2,spare1},
    bucketSizeDuration        ENUMERATED {ms50, ms100,
ms150, ms300, ms500, ms1000, spare2,spare1},
    logicalChannelGroup       INTEGER (0..3)
OPTIONAL          -- Need OR
  }   OPTIONAL,                                   --
Cond UL
  ...,
  [[ logicalChannelSR-Mask-r9   ENUMERATED {setup}
OPTIONAL      -- Cond SRmask
  ]],
  [[ logicalChannelSR-Prohibit-r12  BOOLEAN           OPTIONAL
     -- Need ON
  ]],
  [[ laa-Allowed-r14            BOOLEAN          OPTIONAL,
  -- Need ON
     bitRateQueryProhibitTimer-r14ENUMERATED {s0, s0dot4,
s0dot8, s1dot6, s3, s6, s12, s30}              OPTIONAL  --Need
OR
  ]]
}
```

In an example, bitRateQueryProhibitTimer may be used for bit rate recommendation query in seconds. In an example, bucketSieDuration may be used for logical channel prioritization. In an example, 1aa-Allowed may indicate whether the data of a logical channel is allowed to be transmitted via UL of LAA SCells. Value TRUE may indicate that the logical channel is allowed to be sent via UL of LAA SCells. Value FALSE may indicate that the logical channel is not allowed to be sent via UL of LAA SCells. In an example, logicalChannelGroup may indicate mapping of logical channel to logical channel group for BSR resporting. In an example, logicalChannelSR-Mask may control SR triggering on a logical channel basis when an uplink grant is configured. In an example, value TRUE for logicalChannelSR-Prohibit may indicate that the logicalChannelSR-ProhibitTimer is enabled for the logical channel. In an example, logicalChannelSR-Prohibit may be configured if logicalChannelSR-Prohibit is configured. In an example, prioritisedBitRate may indicate Prioritized bit rate for logical channel prioritisation. In an example, priority may indicate priority for logical channel prioritization procedure.

In an example, a Logical Channel Prioritization (LCP) procedure may be applied when a new transmission is performed. In an example, RRC may control the scheduling of uplink data by signalling for each logical channel: priority where an increasing priority value may indicate a lower priority level, prioritisedBitRate which may set the Prioritized Bit Rate (PBR), bucketSizeDuration which may set the Bucket Size Duration (BSD).

In an example, a MAC entity may maintain a variable Bj for a logical channel j. Bj may be initialized to zero when the related logical channel is established, and incremented by the product PBR×TTI duration for a TTI, where PBR may be Prioritized Bit Rate of logical channel j. In an example, the value of Bj may not exceed the bucket size. In an example, if the value of Bj is larger than the bucket size of logical channel j, it may be set to the bucket size. The bucket size of a logical channel may be equal to PBR×BSD, where PBR and BSD may be configured by upper layers. In an example, the MAC entity may perform a Logical Channel Prioritization procedure when a new transmission is performed.

In an example, the logical channels with Bj>0 may be allocated resources in a decreasing priority order. If the PBR of a logical channel is set to "infinity", the MAC entity may allocate resources for the data that is available for transmission on the logical channel before meeting the PBR of the lower priority logical channel(s). In an example, the MAC entity may decrement Bj by the total size of MAC SDUs served to logical channel j in Step 1. The value of Bj may be negative. In an example, if any resources remain, the logical channels may be served in a strict decreasing priority order (regardless of the value of Bj) until either the data for that logical channel or the UL grant is exhausted, whichever comes first. Logical channels configured with equal priority may be served equally.

In an example embodiment, a wireless device may receive one or more RRC messages. The one or more RRC messages may comprise configuration parameters for grant-free transmissions. In an example, the grant-free configuration parameters may indicate time/frequency of resources and/or periodicity of resources and/or power control related parameters and/or user ID/DMRS configuration parameters and/or HARQ related parameters and/or other parameters for uplink grant-free transmissions. In an example, the grant-free resources may be activated upon receiving/decoding grant-free configuration parameters (e.g., RRC message(s) configuring grant-free transmission for the wireless device) and/or after a configurable/pre-configured time in response to receiving the grant-free transmission configuration parameters. In an example, the grant-free resources may be activated upon receiving a DCI activating the plurality of the grant-free resources. The DCI my correspond to a radio network temporary identifier (RNTI) corresponding to grant-free transmissions. The grant-free RNTI may be configured with RRC, e.g., as part of grant-free configuration parameters. In an example, the plurality of grant-free resources may comprise a first grant-free (GF) resource. The first grant-free resource may comprise a first plurality of frequency domain resources (e.g., resource blocks) and time domain resources (e.g., symbol/slot/subframe). In an example, the first grant-free resource may also be configured and/or activated for one or more other wireless devices and/or one or more other wireless devices may share the first grant-free resource with the wireless device. In an example, the one or more other wireless device may be configured for or activated with grant-free resources that have overlap (e.g., in frequency domain and/or time domain) with the first grant-free resource. In an example, the wireless device may receive, via a physical downlink control channel (PDCCH) or an enhanced PDCCH (EPDCCH), a downlink control information (DCI) indicating uplink transmission parameters comprising a second resource (e.g., grant-based (GB) resource). The second resource may comprise a second plurality of frequency domain resources (e.g., resource blocks) and time domain resources (e.g., symbol/slot/subframe). The timing of the second resource may be after the timing of the first grant-free resource.

In an example embodiment, in response to one or more criteria, the wireless device may skip/ignore the first grant-free resource, for example, even if the wireless device has data to transmit. The wireless device may transmit one or more transport blocks using the second resource.

Figure 18:
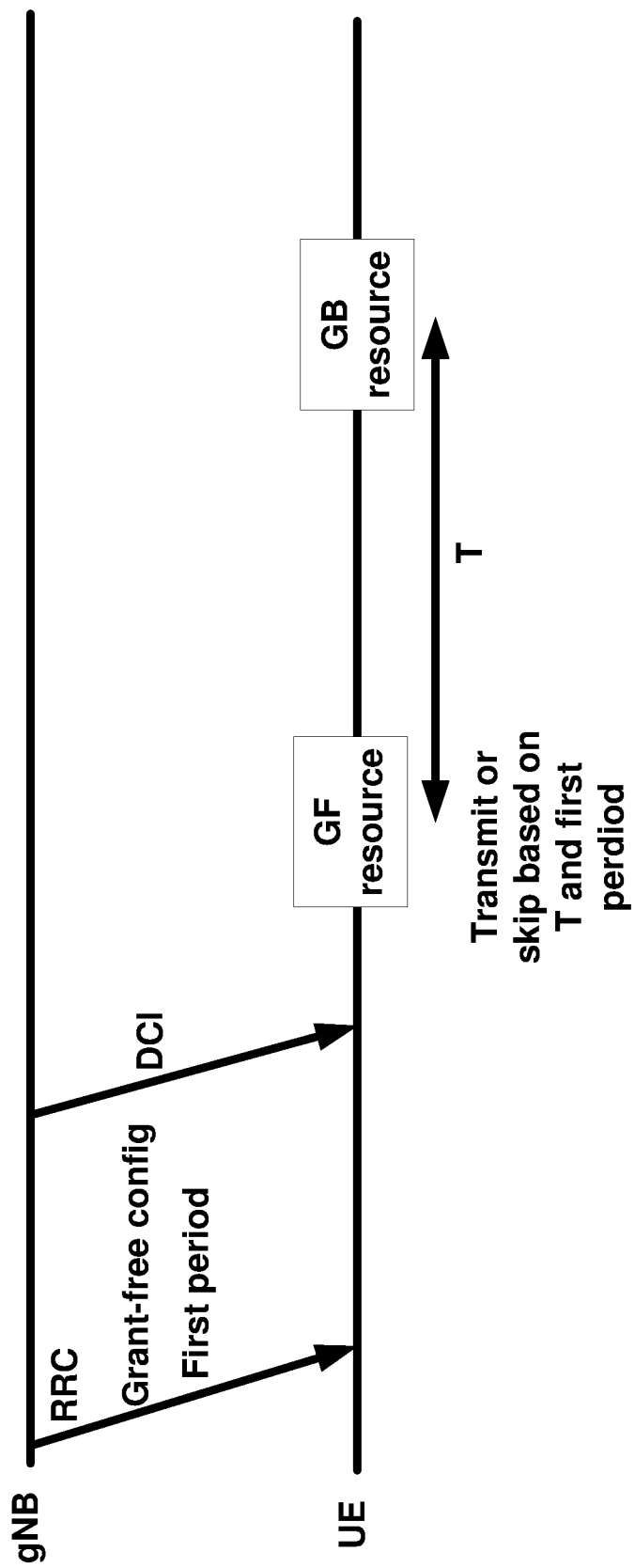
FIG. 18 is an example transmission or skipping procedure as per an aspect of an embodiment of the present invention.

In an example embodiment, the one or more criteria may comprise the second resource being configured within a first period of time of the first grant-free resource. The first period of time may be k symbols/slots/subframes. An example procedure is shown in FIG. 18. In an example, the first period of time (e.g., the value of k) may be RRC configured, e.g., explicitly and/or as part of the grant-free resource configuration and/or other configuration parameters. In an example, the first period of time may be implicitly derived from other RRC configuration parameters. In an example, the first period of time may be one or more may pre-configured values. The one or more pre-configured values may be mapped to one or more service types/logical channels/TTIs/numerologies/etc. In an example, the first period of time may be indicated in a DCI. In an example, the first period of time may be indicated by the DCI activating grant-free transmission for the wireless device. In an example embodiment, RRC may configure a plurality of time periods (e.g., zero symbol/slot/subframe, one symbol/slot/subframe, two symbol/slot/subframe, etc.) for the first period of time. In an example, the plurality of time periods may correspond to a plurality of service types (e.g., URLLC, mMTC, eMBB) and/or logical channels and/or logical channel groups that the wireless device has data for transmission and/or TTIs/numerologies. In an example, the wireless device may, based on the RRC configuration and its available data for transmission, select a time period in the plurality of time periods as the first time period. In an example, the DCI activating the grant-free transmission may indicate a time period in the plurality of time periods (e.g., using an index) for the first time period. In an example, the DCI activating the grant-free transmission may comprise a field indicating (e.g., using an index) the first time period among the plurality of RRC configured time periods for the first time period.

In an example embodiment, the wireless device may utilize and transmit data in the first grant-free resource if the wireless device has one or more signal and/or data and/or one or more MAC CE to transmit even if the one or more criteria is met (e.g., the second resource is within the first period of time of the first grant-free resource). In an example, the wireless device may utilize and transmit data in the first grant-free resource if the wireless device has one or more uplink control information (e.g., aperiodic CSI, HARQ feedback, beam-related UCI, e.g., beam management related UCI, etc.) even if the one or more criteria is met. In an example, the wireless device may utilize and transmit data in the first grant-free resource if the wireless device has one or more MAC CE (e.g., SPS/grant-free confirmation, BSR, PHR, etc.) even if the one or more criteria is met.

In an example embodiment, a wireless device may receive one or more messages comprising one or more RRC messages. The one or more RRC messages may comprise configuration parameters for one or more cells. In an example, the one or more RRC messages may comprise configuration parameters for one or more grant-free transmission. In an example, the grant-free configuration parameters may indicate time/frequency of resources and/or periodicity of resources and/or power control parameters and/or user ID/DMRS configuration parameters and/or HARQ related parameters and/or other parameters for uplink grant-free transmissions. In an example, grant-free resources may be activated upon receiving/decoding grant-free configuration parameters (e.g., RRC message(s) configuring grant-free transmission for the wireless device) and/or after a configurable/pre-configured time in response to receiving the grant-free transmission configuration parameters. In an example, the grant-free resources may be activated upon receiving a DCI activating the plurality of the grant-free resources. The DCI my correspond to a radio network temporary identifier (RNTI) corresponding to grant-free transmissions. The grant-free RNTI may be configured with RRC, e.g., as part of grant-free configuration parameters. In an example, the one or more RRC messages may comprise configuration parameters for one or more SPSs. The SPS configuration parameters may comprise SPS RNTI, periodicity of SPS resources, power control parameters, etc. In an example, the one or more RRC messages may comprise configuration parameters for one or more logical channels and/or logical channel groups. The one or more RRC messages may comprise configuration parameters for logical channel prioritization procedure. In an example, the wireless device may be configured with a first resource (e.g., dynamically configured, e.g., with a DCI and/or semi-statically configured (e.g., SPS resource) and/or configured as a grant-free resource). The first resource may comprise a first plurality of frequency domain resources (e.g., resource blocks) and time domain resources (e.g., symbol/slot/subframe). The wireless device may be configured with a second resource (e.g., dynamically configured and/or semi-statically configured (e.g., SPS resource) and/or configured as a grant-free resource). The second resource may comprise a second plurality of frequency domain resources (e.g., resource blocks) and time domain resources (e.g., symbol/slot/subframe). In an example embodiment, the wireless device may multiplex one or more first logical channels and/or MAC CEs in one or more first TBs for an uplink transmission (e.g., using a logical channel prioritization procedure) using the first resource based on the relative timing of the first resource and the second resource. In an example, the one or more first logical channels and/or MAC CEs multiplexed in the one or more first TBs may be based on the relative timing of the first resource and the second resource. In an example, the wireless device may exclude one or more second logical channels from the one or more logical channels for logical channel multiplexing/logical channel prioritization based on the relative timing of the first resource and the second resource. In an example, in response to the second resource occurring on or after a second period of time, the wireless device may exclude one or more second logical channels and/or MAC CEs. In an example, the second period of time may be RRC configured. In an example, RRC may configure a plurality of time periods corresponding to a plurality of logical channels and/or MAC CEs for the second period of time.

Figure 19:
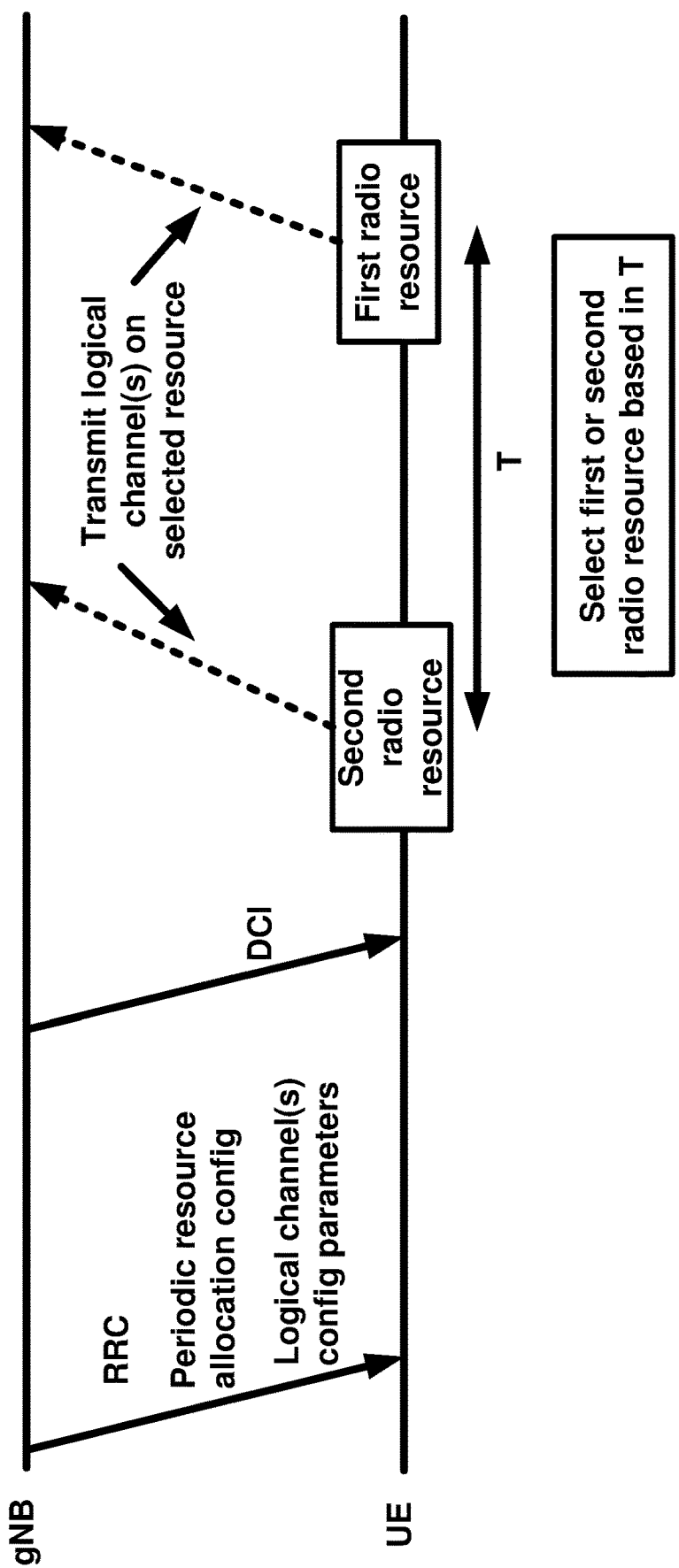
FIG. 19 is an example resource selection procedure as per an aspect of an embodiment of the present invention.

An example embodiment is shown in FIG. 19. A wireless device may receive one or more messages comprising configuration parameters. The one or more messages may comprise RRC messages. The one or more messages may comprise first configuration parameters of a periodic resource allocation. In an example, the periodic resource allocation may be semi-persistent scheduling resource allocation. In an example, the periodic resource allocation may comprise uplink transmission without uplink grant (e.g., configured grant, grant-free transmission, etc.). In an example, the first configuration parameters may comprise a periodicity parameter. The one or more messages may comprise second configuration parameters of one or more logical channels. In an example, the second configuration parameters may indicate one or more priorities of the one or more logical channels.

The wireless device may receive a downlink control information indicating a first radio resource. The downlink control information may be for a dynamic grant. In an example, a second radio resource may be for the periodic resource allocation (e.g., configured by the first configuration parameters). In an example, the second radio resource may be based on the periodicity parameter. In an example, the second radio resource may occur later than the first radio resource. The wireless device may select, as a selected radio resource and based on a time difference between the first radio resource and the second radio resource, one of the first radio resource and the second radio resource. In an example, the first radio resource may be selected in response to the time difference being smaller than or equal to a first duration. In an example, the first duration may be RRC configured. In an example, the first duration may be pre-configured. In an example the first duration may be logical channel-specific and may be different for different logical channels. In an example, the first duration may be based on a number of symbols, slots or subframes. In an example, the wireless device may multiplex data of the one or more logical channels in the transport block. The wireless device may transmit one or more logical channels in a transport block via the selected resource. In an example, the transmitting the data of the one or more logical channels may comprise excluding one or more second logical channels of a plurality of logical channels.

Figure 15:
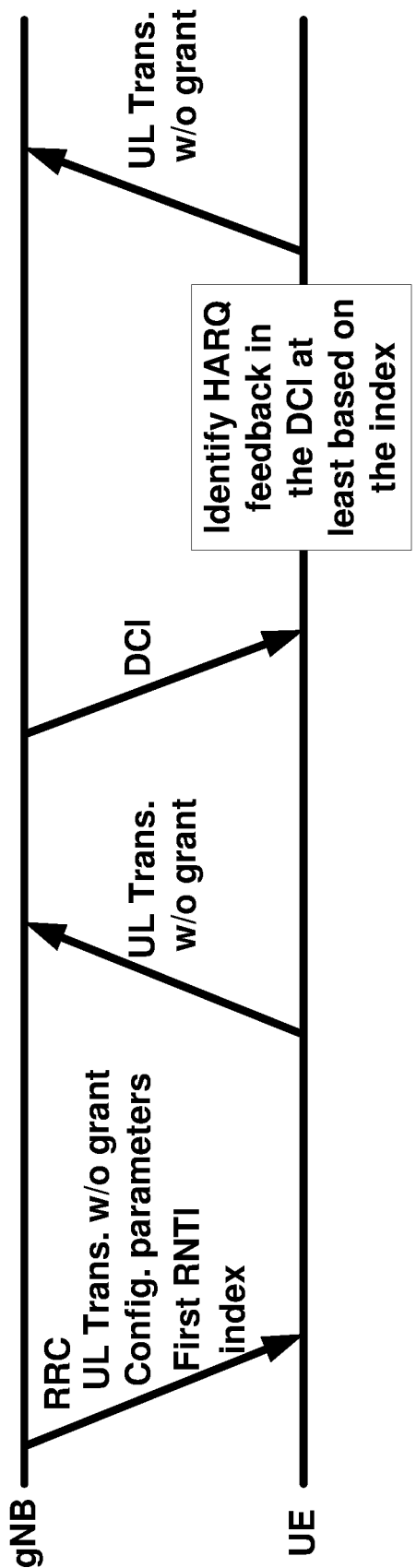
FIG. 15 is an example HARQ feedback procedure as per an aspect of an embodiment of the present invention.

In an example embodiment, a wireless device may be configured with the first RNTI and an index. In an example, the wireless device may receive one or more RRC messages configuring the first RNTI and the index. The UE may receive a DCI (e.g., a group common DCI) corresponding to the first RNTI. The DCI may comprise a plurality of ACKs/NACKs for a plurality of UEs configured with the same first RNTI. In an example, the UE may identify at least one ACK/NACK, in the plurality of ACKs/NACKs, corresponding to at least one TB employing at least the index. An example procedure is shown in FIG. 15. The at least one TB may be transmitted using radio resources for uplink transmission without grant (e.g., SPS and/or grant free resources).

Figure 16:
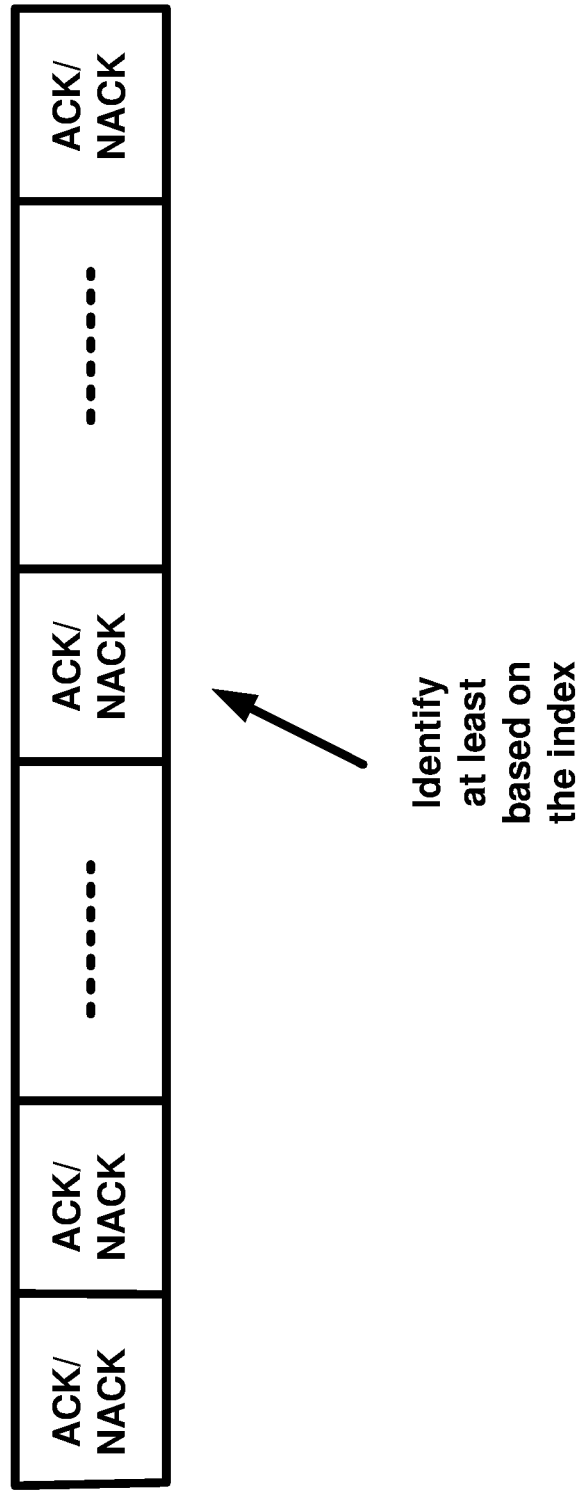
FIG. 16 is an example HARQ feedback procedure as per an aspect of an embodiment of the present invention.

In an example embodiment, a wireless device may receive one or more messages. The one or more messages may comprise one or more RRC messages. The one or more messages may comprise configuration parameters for one or more cells. The one or more messages may comprise uplink transmission without grant (e.g., SPS and/or grant-free) configuration parameters. In an example, at least part of the uplink transmission without grant configuration parameters may be common among the SPS and grant-free. The uplink transmission without grant configuration parameters may indicate an interval for uplink transmission without grant resources. The interval may indicate a period of time for an uplink transmission without grant and/or a period of time for the uplink transmission without grant and one or more repetitions of the uplink transmission without grant. In an example, the uplink transmission without grant configuration parameters may comprise power control related parameters. In an example, the uplink transmission without grant configuration parameters may comprise time/frequency resources, DMRS (e.g., UE-specific DMRS) configuration parameters, TBS/MCS, HARQ relate parameters, etc. In an example, the uplink transmission without grant configuration parameters may comprise a first RNTI and an index. In an example, the first RNTI may be used for transmission, by a base station, of a DCI (e.g., group common DCI) comprising a plurality of HARQ feedbacks corresponding to uplink transmissions without grant for a plurality of wireless devices. In an example, the index may be used by the wireless device to identify at least one HARQ feedback (e.g., ACK/NACK) in a plurality of HARQ feedbacks. The wireless device may transmit at least one first TB corresponding to at least one HARQ process employing at least one uplink transmission without grant resource (e.g., SPS resource or grant free resource). The wireless device may identify the at least one HARQ process employing the radio resources (e.g., time and frequency resources) for transmission of the at least one TB. The wireless device may monitor a common search space for a DCI corresponding to the first RNTI. In an example, the common search space may be on a primary cell. In an example, the common search space may be on a secondary cell. In an example, the common search space may be on the cell configured with uplink transmission without grant resources. The wireless device may identify at least one HARQ feedback, in the plurality of HARQ feedbacks, corresponding to the at least one first TB at least based on the index. An example procedure is shown in FIG. 15 and FIG. 16. In an example, the index may identify a plurality of HARQ feedbacks for a UE, for example, when the UE has a plurality of pending HARQ feedbacks or when the UE transmits a plurality of TBs using an uplink transmission without grant resource. In an example, the wireless device may transmit at least one second TB employing the at least one HARQ process in response to the at least one HARQ feedback indicating ACK.

Figure 17:
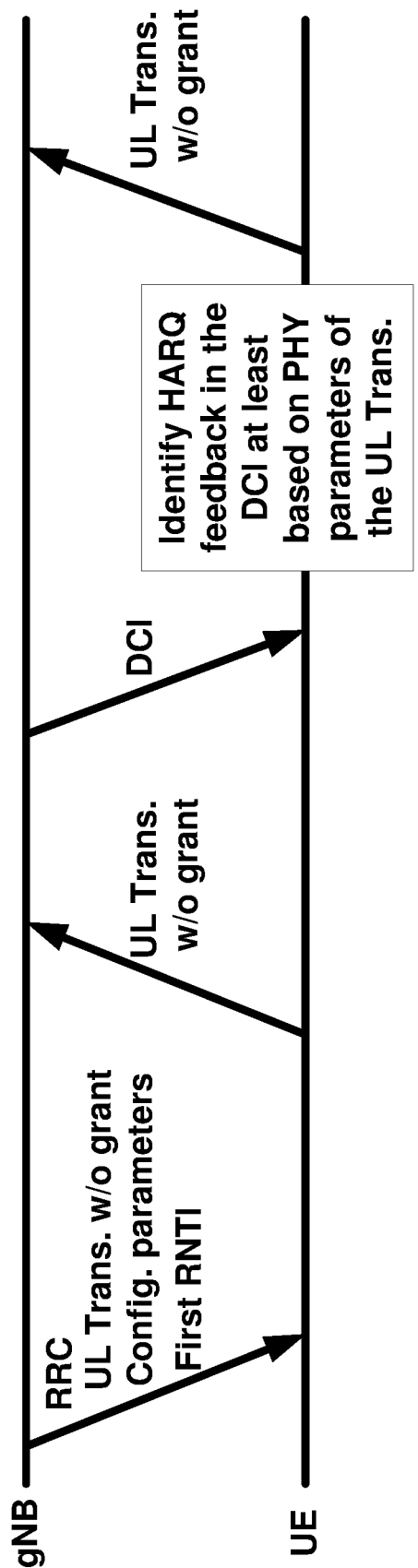
FIG. 17 is an example HARQ feedback procedure as per an aspect of an embodiment of the present invention.

In an example embodiment, a wireless device may be configured with the first RNTI. In an example, the wireless device may receive one or more RRC messages configuring the first RNTI. The UE may receive a DCI (e.g., a group common DCI) corresponding to the first RNTI. The DCI may comprise a plurality of ACKs/NACKs for a plurality of UEs configured with the same first RNTI. In an example, the UE may identify at least one ACK/NACK, in the plurality of ACKs/NACKs, corresponding to at least one TB employing at least one or more physical layer parameters corresponding to the at least one uplink transmission of the at least one TB. An example procedure is shown in FIG. 17. In an example, the physical layer parameters may comprise radio resources for the at least one uplink transmission (e.g., time/frequency resources of the at least one uplink transmission, etc.) and/or a DMRS (e.g., DMRS sequence) employed in the at least one uplink transmission and or UE specific ID.

In an example embodiment, a wireless device may receive one or more messages. The one or more messages may comprise one or more RRC messages. The one or more messages may comprise configuration parameters for one or more cells. The one or more messages may comprise uplink transmission without grant (e.g., SPS and/or grant-free) configuration parameters. In an example, at least part of the uplink transmission without grant configuration parameters may be common among the SPS and grant-free. The uplink transmission without grant configuration parameters may indicate an interval for uplink transmission without grant resources. The interval may indicate a period of time for an uplink transmission without grant and/or a period of time for the uplink transmission without grant and one or more repetitions of the uplink transmission without grant. In an example, the uplink transmission without grant configuration parameters may comprise power control related parameters. In an example, the uplink transmission without grant configuration parameters may comprise time/frequency resources, DMRS (e.g., UE-specific DMRS) configuration parameters, TBS/MCS, HARQ relate parameters, etc. In an example, the uplink transmission without grant configuration parameters may comprise a first RNTI. In an example, the first RNTI may be used for transmission, by a base station, of a DCI (e.g., group common DCI) comprising a plurality of HARQ feedbacks corresponding to uplink transmissions without grant for a plurality of wireless devices. The wireless device may transmit at least one first TB corresponding to at least one HARQ process employing at least one uplink transmission without grant resource (e.g., SPS resource or grant free resource). The wireless device may identify the at least one HARQ process employing the radio resources (e.g., time and frequency resources) for transmission of the at least one TB. The wireless device may monitor a common search space for a DCI corresponding to the first RNTI. In an example, the common search space may be on a primary cell. In an example, the common search space may be on a secondary cell. In an example, the common search space may be on the cell configured with uplink transmission without grant resources. The wireless device may identify at least one HARQ feedback, in the plurality of HARQ feedbacks, corresponding to the at least one first TB at least based on one or more physical layer parameters corresponding to the at least one uplink transmission of the at least one TB. An example is shown in FIG. 17. In an example, the physical layer parameters may comprise radio resources for the at least one uplink transmission (e.g., time/frequency resources of the at least one uplink transmission, etc.) and/or a DMRS (e.g., DMRS sequence) employed in the at least one uplink transmission and/or a UE specific ID. In an example, the physical layer resources/parameters used for an uplink transmission without grant (e.g., for one or more TBs of an uplink transmission without grant) may determine an order in the plurality of HARQ feedbacks that determines the at least one HARQ feedback corresponding to the uplink transmission without grant.

In an example embodiment, the wireless device may monitor a common search space for DCI at least for a portion of a period of time. In an example, the period of time may be pre-configured. In an example, the period of time may be a time for transmission of an uplink transmission without grant and one or more repetition of the uplink transmission without grant. In an example, the period of time may be the RRC configured interval value for the uplink transmission without grant. In an example, the period of time may be configured by RRC. In an example, the period of time may be indicated in a DCI, e.g., the DCI activating the uplink transmission without grant. In an example, the wireless device may start a timer in response to transmitting an uplink transmission without grant. The timer value may be the period of time. In an example, the portion of the period of time may be the time until the DCI comprising HARQ feedback (e.g., the group common DCI) is received. In an example, the wireless device may stop the timer in response to receiving the DCI comprising the HARQ feedback (e.g., the group common DCI). In an example embodiment, if the wireless device does not receive the DCI comprising the HARQ feedback within the period of time, the wireless device may assume an ACK. In an example, if the wireless device does not receive DCI comprising the HARQ feedback within the period of time, the wireless device may assume a NACK.

In an example embodiment, a DCI (e.g., group common DCI) may comprise a plurality of HARQ feedbacks for a plurality of UEs. In an example, the DCI may comprise a plurality of HARQ feedbacks for a UE in the plurality of UEs. The plurality of HARQ feedbacks for the UE may correspond to a plurality of HARQ process IDs. In an example, the wireless device may identify a HARQ process ID corresponding to a HARQ feedback in the plurality of HARQ feedbacks. In an example, the wireless device may identify a HARQ process ID corresponding to a HARQ feedback in the plurality of HARQ feedbacks based on a rule. In an example, the DCI may indicate the HARQ feedbacks and/or the HARQ process IDs associated with the HARQ feedbacks and/or the number of HARQ feedbacks for a wireless device. In an example, the DCI may comprise one or more fields and the one or more fields may indicate the HARQ feedbacks and/or the HARQ process IDs associated with the HARQ feedbacks and/or the number of HARQ feedbacks for the wireless device. In an example, the one or more fields in the DCI may be a bitmap field. The bitmap field may indicate the number of HARQ feedbacks and/or the HARQ feedbacks for a UE and/or the HARQ process IDs associated with the HARQ feedbacks for the UE. In an example, a first field in the one or more fields may identify a UE and/or one or more HARQ feedbacks of a UE (e.g., one or more HARQ feedback corresponding to one or more HARQ process). Another field in the DCI may indicate the one or more HARQ feedbacks corresponding to the first field.

In an example embodiment, a wireless device may expect a first plurality of pending HARQ feedbacks for a plurality of TBs. In an example, the plurality of TBs may correspond to a plurality of HARQ process IDs. In an example, a first plurality of TBs in the plurality of TBs may correspond to a same HARQ process ID and/or same uplink transmission without grant. In an example, the wireless may receive a second plurality of HARQ feedbacks (ACK/NACKs) in a DCI comprising the HARQ feedbacks. The second plurality of HARQ feedbacks may be less than the first plurality of HARQ feedbacks. The wireless device may associate the second plurality of HARQ feedbacks with a second plurality in the first plurality of pending HARQ feedbacks. The wireless device may assume ACK for the other pending HARQ feedbacks. In an example, if a wireless device receives one ACK/NACK in the DCI comprising the HARQ feedback and the wireless device expects a plurality of ACK/NACKs, the wireless device may assume the ACK/NACK indicated in the DCI for a latest transmitted TB and may assume ACK for the other TBs. In an example, the wireless device may assume the ACK/NACK indicated in the DCI for all pending HARQ feedbacks/TBs.

In an example embodiment, the DCI comprising the HARQ feedbacks for uplink transmission without grant may have one of a plurality of sizes. In an example, the DCI comprising the HARQ feedbacks for uplink transmission without grant may be one of a plurality of DCI formats. In an example, the base station may determine the one of the plurality of DCI formats/sizes bases on one or more criteria.

In an example, the one or more criteria may comprise the number of the plurality of HARQ feedbacks included in the DCI. Other rules/criteria may be used by the base station to determine the DCI format/size. In an example, the plurality of DCI formats/sizes may be pre-configured for the wireless device. In an example, the DCI formats/sizes may be configured for the wireless device. In an example, the wireless device may receive one or more messages indicating the plurality of formats/sizes. The wireless device may monitor the DCI for the plurality of DCI formats/sizes.

Figure 20:
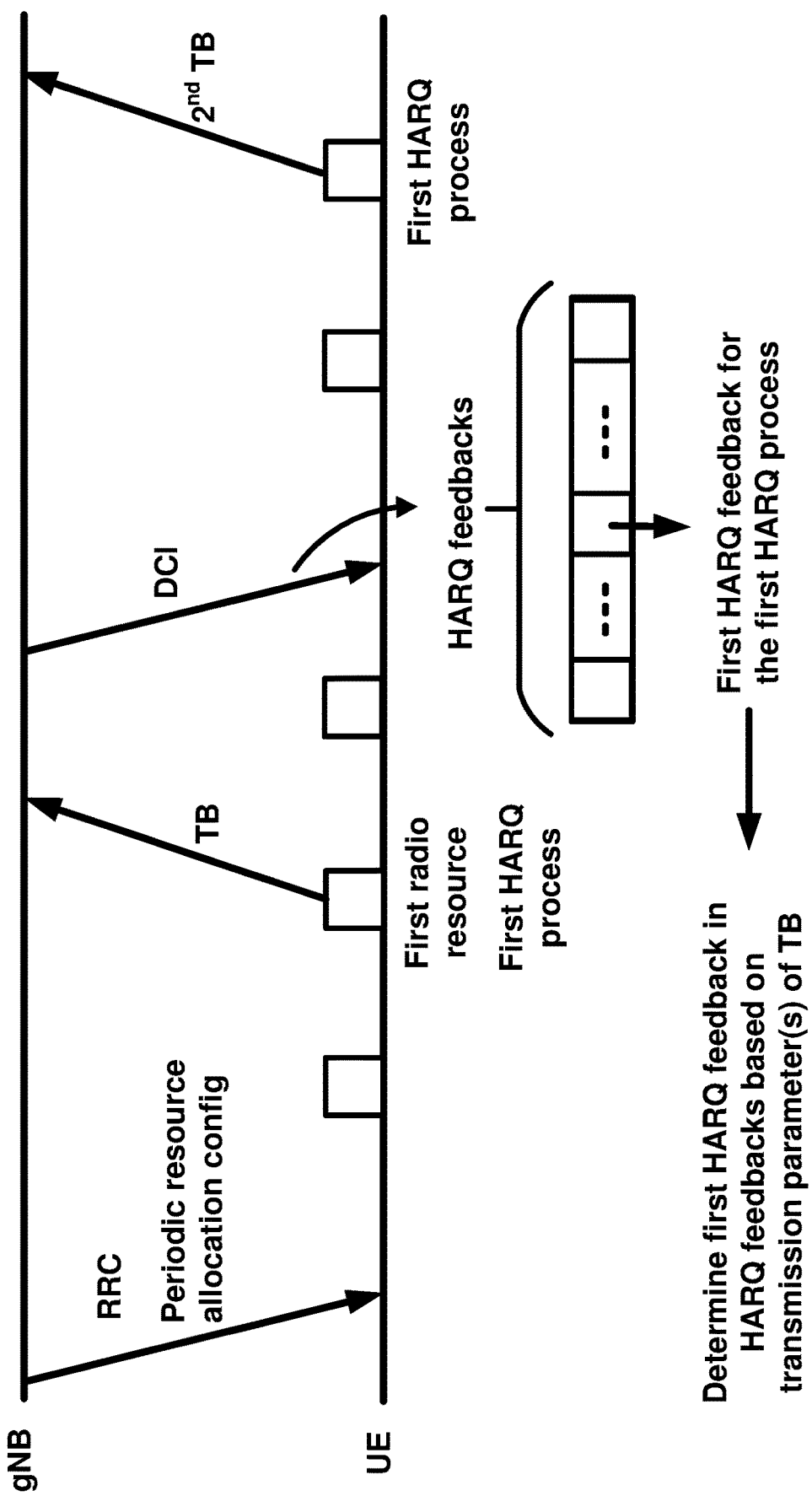
FIG. 20 is an example HARQ feedback determination as per an aspect of an embodiment of the present invention.

An example embodiment is shown in FIG. 20. A wireless device may receive one or more messages comprising configuration parameters. The one or more messages may comprise RRC messages. The one or more messages may comprise first configuration parameters of a periodic resource allocation. In an example, the periodic resource allocation may be semi-persistent scheduling resource allocation. In an example, the periodic resource allocation may comprise uplink transmission without uplink grant (e.g., configured grant, grant-free transmission, etc.). In an example, the first configuration parameters may comprise a periodicity parameter. In an example, the first periodic resource allocation may comprise a first radio resource. In an example, the first configuration parameters may comprise an interval. The first radio resource may be determined based on the interval. The wireless device may transmit, via the first radio resource of the first periodic resource allocation, a first transport block in a plurality of transport blocks. In an example, the plurality of transport blocks may be transmitted via radio resources of the first periodic resource allocation.

In an example, the wireless device may monitor a control channel for a downlink control information. In an example, the downlink control information may comprise HARQ feedback information. In an example, the downlink control information may be associated with a radio network temporary identifier. In an example, the monitoring may be based on a periodicity. In an example, the periodicity may be RRC configured. In an example, the wireless device may receive a downlink control information comprising a plurality of hybrid automatic repeat request (HARQ) feedbacks for the plurality of transport blocks. In an example, the downlink control information may be a group common DCI. The plurality of HARQ feedbacks may comprise a first HARQ feedback corresponding to the first transport block. The first transport block may correspond to the first HARQ process. In an example, the one or more messages may comprise a radio network temporary identifier and the downlink control information may be associated with the radio network temporary identifier.

In an example, the wireless device may identify the first HARQ feedback in the plurality of HARQ feedbacks based on one or more transmission parameters of the first transport block. In an example, the one or more transmission parameters may comprise the first radio resource. In an example, the first radio resource may indicate a position of the first HARQ feedback in the plurality of HARQ feedbacks. In an example, the one or more transmission parameters may comprise one or more demodulation reference signals. In an example, the one or more demodulation reference signals may indicate a position of the first HARQ feedback in the plurality of HARQ feedbacks. The wireless device may transmit a second transport block corresponding to the first HARQ process in response to the first HARQ feedback indicating an acknowledgement.

According to various embodiments, a device such as, for example, a wireless device, off-network wireless device, a base station, and/or the like, may comprise one or more processors and memory. The memory may store instructions that, when executed by the one or more processors, cause the device to perform a series of actions. Embodiments of example actions are illustrated in the accompanying figures and specification. Features from various embodiments may be combined to create yet further embodiments.

Figure 21:
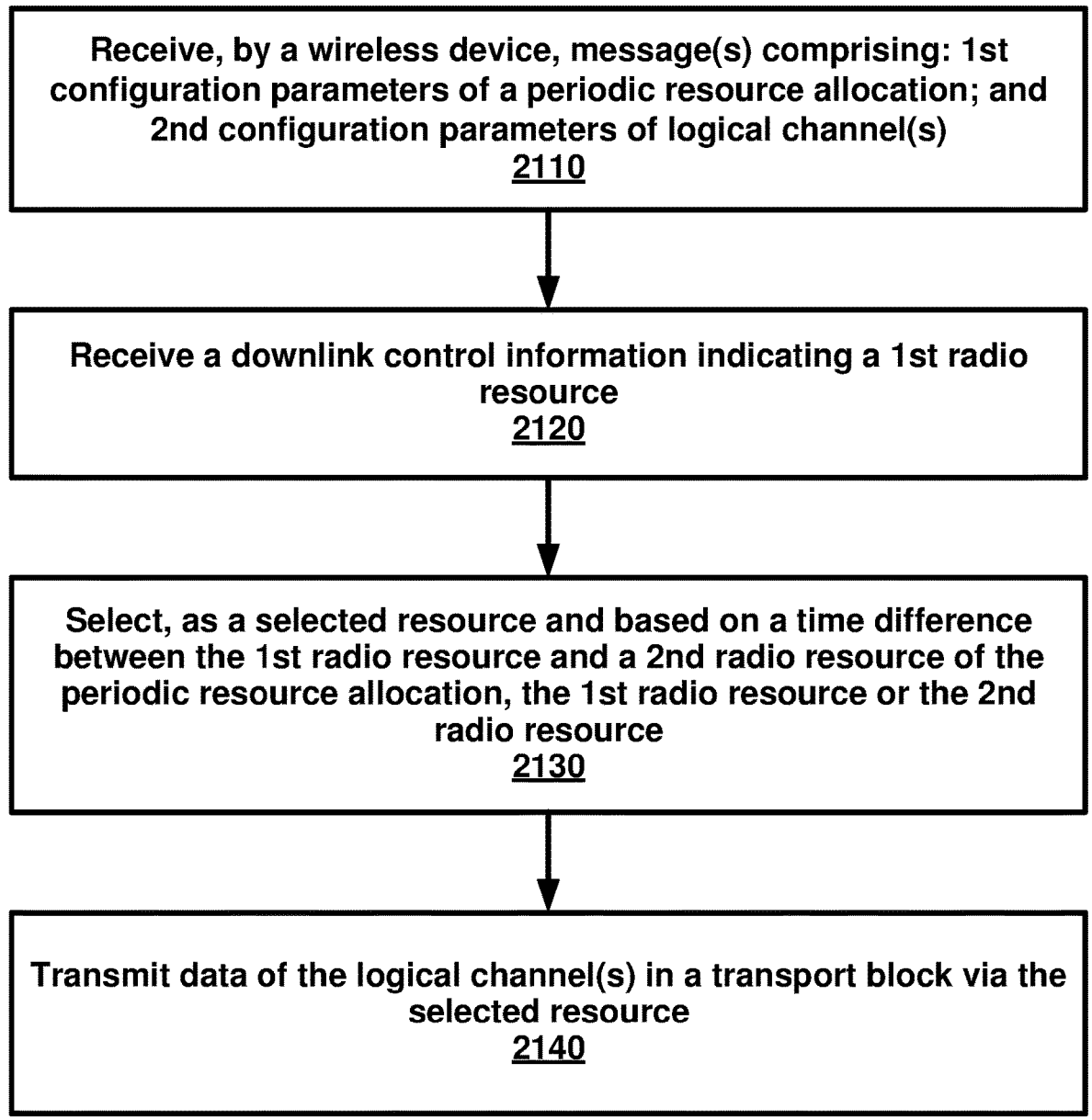
FIG. 21 is a flow diagram of an aspect of an embodiment of the present disclosure.

FIG. 21 is an example flow diagram as per an aspect of an embodiment of the present disclosure. At 2110, a wireless device may receive one or more messages. The one or more messages may comprise first configuration parameters of a periodic resource allocation, and second configuration parameters of one or more logical channels. At 2120, downlink control information may be received. The downlink control information may indicate a first radio resource. At 2130, the first radio resource or the second radio resource may be selected as a selected resource based on a time difference between the first radio resource and a second radio resource of the periodic resource allocation. At 2140, data of the one or more logical channels in a transport block may be transmitted via the selected resource.

According to an example embodiment, the first configuration parameters comprise a periodicity parameter. According to an example embodiment, the second radio resource may be determined based on the periodicity parameter. According to an example embodiment, the second configuration parameters may indicate one or more priorities for the one or more logical channels. According to an example embodiment, the transmitting the data of the one or more logical channels may comprise excluding one or more second logical channels of a plurality of logical channels. According to an example embodiment, the second radio resources may occur after the first radio resources. According to an example embodiment, the first radio resource may be selected as the selected radio resource in response to the time difference being less than or equal to a first duration. According to an example embodiment, the one or more messages may indicate the first duration. According to an example embodiment, the first duration is based on a first number of symbols. According to an example embodiment, the first duration is based on a first number of slots. According to an example embodiment, the first duration is based on a first number of subframes. According to an example embodiment, the data of the one or more logical channels may be multiplexed in the transport block. According to an example embodiment, the multiplexing of the one or more logical channels may comprise excluding one or more second logical channels of a plurality of logical channels. According to an example embodiment, the data of the one or more logical channels may be multiplexed in the transport block. According to an example embodiment, the first radio resource may be selected as the selected radio resource in response to the time difference being less than or equal to a first duration. According to an example embodiment, the multiplexing of the data of the one or more logical channels may comprise excluding one or more second logical channels of a plurality of logical channels. According to an example embodiment, the first radio resource may be selected as the selected radio resource in response to the time difference being less than or equal to a first duration. According to an example embodiment, the one or more messages may indicate the first duration. According to an example embodiment, the first duration is based on a first number of symbols. According to an example embodiment, the first duration is based on a first number of slots. According to an example embodiment, the first duration is based on a first number of subframes. According to an example embodiment, the second configuration parameters may indicate one or more priorities for the one or more logical channels. According to an example embodiment, the transmission of the data of the one or more logical channels may be based on the one or more priorities. According to an example embodiment, the second radio resource may occur after the first radio resources.

Figure 22:
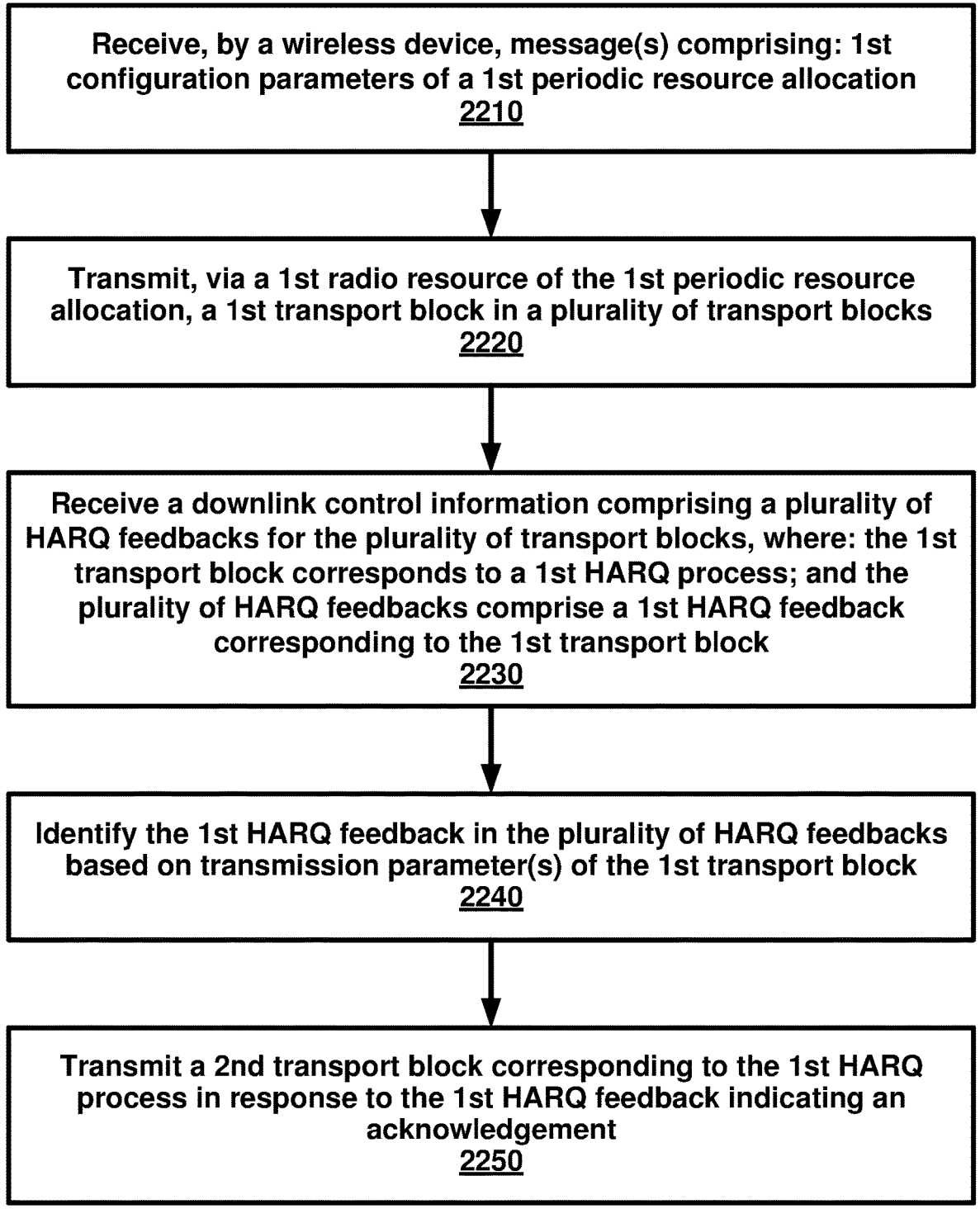
FIG. 22 is a flow diagram of an aspect of an embodiment of the present disclosure.

FIG. 22 is an example flow diagram as per an aspect of an embodiment of the present disclosure. At 2210, a wireless device may receive one or more messages. The one or more messages may comprise first configuration parameters of a first periodic resource allocation. At 2220, a first transport block in a plurality of transport blocks may be transmitted via a first radio resource of the first periodic resource allocation. At 2230, a downlink control information may be received. The downlink control information may comprise a plurality of hybrid automatic repeat request (HARQ) feedbacks for the plurality of transport blocks. The first transport block may correspond to a first HARQ process. The plurality of HARQ feedbacks may comprise a first HARQ feedback corresponding to the first transport block. At 2240, the first HARQ feedback in the plurality of HARQ feedbacks may be identified based on one or more transmission parameters of the first transport block. At 2250, a second transport block corresponding to the first HARQ process may be transmitted in response to the first HARQ feedback indicating an acknowledgement.

According to an example embodiment, the one or more transmission parameters may comprise the first radio resource. According to an example embodiment, the plurality of transport blocks may be transmitted via radio resources of the first periodic resource allocation. According to an example embodiment, the one or more messages may indicate a radio network temporary identifier. According to an example embodiment, the downlink control information may be associated with the radio network temporary identifier. According to an example embodiment, the first radio resource may indicate a position of the first HARQ feedback in the plurality of HARQ feedbacks.

According to an example embodiment, a control channel may be monitored, based on a periodicity, for the downlink control information. According to an example embodiment, the first configuration parameters may comprise an interval. According to an example embodiment, the first radio resource may be determined based on the interval. According to an example embodiment, the one or more transmission parameters may comprise one or more demodulation reference signals. According to an example embodiment, the plurality of transport blocks may be transmitted via radio resources of the first periodic resource allocation. According to an example embodiment, the one or more messages may indicate a radio network temporary identifier. According to an example embodiment, the downlink control information may be associated with the radio network temporary identifier. According to an example embodiment, the first radio resource may indicate a position of the first HARQ feedback in the plurality of HARQ feedbacks.

According to an example embodiment, a control channel may be monitored, based on a periodicity, for the downlink control information. According to an example embodiment, the plurality of transport blocks may be transmitted via radio resources of the first periodic resource allocation. According to an example embodiment, the one or more messages may indicate a radio network temporary identifier. According to an example embodiment, the downlink control information may be associated with the radio network temporary identifier. According to an example embodiment, the one or more transmission parameters of the first transport block may indicate a position of the first HARQ feedback in the plurality of HARQ feedbacks.

According to an example embodiment, a control channel may be monitored, based on a periodicity, for the downlink control information. According to an example embodiment, the first configuration parameters may comprise an interval. According to an example embodiment, the first radio resource may be determined based on the interval. According to an example embodiment, the one or more messages may indicate a size of the downlink control information. According to an example embodiment, the downlink control information may comprise a group common downlink control information. According to an example embodiment, the downlink control information may comprise a first plurality of HARQ feedbacks for a plurality of wireless devices comprising the wireless device. According to an example embodiment, the first plurality of HARQ feedbacks may comprise the plurality of HARQ feedbacks.

In this specification, "a" and "an" and similar phrases are to be interpreted as "at least one" and "one or more." In this specification, the term "may" is to be interpreted as "may, for example." In other words, the term "may" is indicative that the phrase following the term "may" is an example of one of a multitude of suitable possibilities that may, or may not, be employed to one or more of the various embodiments. If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}.

In this specification, parameters (Information elements: IEs) may comprise one or more objects, and each of those objects may comprise one or more other objects. For example, if parameter (IE) N comprises parameter (IE) M, and parameter (IE) M comprises parameter (IE) K, and parameter (IE) K comprises parameter (information element) J, then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many of the elements described in the disclosed embodiments may be implemented as modules. A module is defined here as an isolatable element that performs a defined function and has a defined interface to other elements. The modules described in this disclosure may be implemented in hardware, software in combination with hardware, firmware, wetware (i.e hardware with a biological element) or a combination thereof, all of which are behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) using FDD communication systems. However, one skilled in the art will recognize that embodiments of the invention may also be implemented in a system comprising one or more TDD cells (e.g. frame structure 2 and/or frame structure 3-licensed assisted access). The disclosed methods and systems may be implemented in wireless or wireline systems. The features of various embodiments presented in this invention may be combined. One or many features (method or system) of one embodiment may be implemented in other embodiments. Only a limited number of example combinations are shown to indicate to one skilled in the art the possibility of features that may be combined in various embodiments to create enhanced transmission and reception systems and methods.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112.

What is claimed is:

1. A method comprising:
   receiving, by a wireless device, one or more messages comprising:
      first configuration parameters of a periodic resource allocation; and
      second configuration parameters of one or more logical channels;
   receiving a downlink control information indicating a first radio resource;
   selecting, as a selected resource and based on a time difference between the first radio resource and a second radio resource of the periodic resource allocation, the first radio resource or the second radio resource, wherein the first radio resource is selected as the selected radio resource in response to the time difference being less than or equal to a first duration; and
   transmitting data of the one or more logical channels in a transport block via the selected resource.

2. The method of claim 1, wherein the first configuration parameters comprise a periodicity parameter.

3. The method of claim 2, further comprising determining the second radio resource based on the periodicity parameter.

4. The method of claim 3, wherein the second configuration parameters indicate one or more priorities for the one or more logical channels.

5. The method of claim 4, wherein the transmitting the data of the one or more logical channels comprises excluding one or more second logical channels of a plurality of logical channels.

6. The method of claim 3, wherein the second radio resources occur after the first radio resource.

7. The method of claim 2, further comprising multiplexing the data of the one or more logical channels in the transport block.

8. The method of claim 7, wherein the multiplexing the one or more logical channels comprises excluding one or more second logical channels of a plurality of logical channels.

9. The method of claim 1, further comprising multiplexing the data of the one or more logical channels in the transport block.

10. The method of claim 9, wherein the multiplexing the data of the one or more logical channels comprises excluding one or more second logical channels of a plurality of logical channels.

11. The method of claim 1, wherein the one or more messages indicate the first duration.

12. The method of claim 1, wherein the first duration is based on a first number of:
   symbols;
   slots; or
   subframes.

13. The method of claim 1, wherein the second configuration parameters indicate one or more priorities for the one or more logical channels.

14. The method of claim 13, wherein the transmitting the data of the one or more logical channels is based on the one or more priorities.

15. The method of claim 1, wherein the second radio resource occurs after the first radio resource.

* * * * *

UNITED STATES PATENT AND TRADEMARK OFFICE
CERTIFICATE OF CORRECTION

PATENT NO. : 11,147,064 B2  
APPLICATION NO. : 16/122428  
DATED : October 12, 2021  
INVENTOR(S) : Alireza Babaei et al.

Page 1 of 1

It is certified that error appears in the above-identified patent and that said Letters Patent is hereby corrected as shown below:

On the Title Page

In item (60), add --Provisional application No. 62/563,256 filed on Sep. 26, 2017.--

Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*